United States Patent
Iida et al.

(10) Patent No.: US 7,411,351 B2
(45) Date of Patent: Aug. 12, 2008

(54) ARC TUBE FORMED FROM A GLASS TUBE AND HAVING A SPIRALLY WOUND SECTION WITHIN ONE PLANE

(75) Inventors: Shiro Iida, Kyoto (JP); Noriyuki Uchida, Hirakata (JP); Hidezoh Akutsu, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 408 days.

(21) Appl. No.: 10/991,726

(22) Filed: Nov. 18, 2004

(65) Prior Publication Data

US 2005/0162089 A1     Jul. 28, 2005

(30) Foreign Application Priority Data

Nov. 25, 2003  (JP)  ............... 2003-394710

(51) Int. Cl.
*H01J 17/16* (2006.01)
*H01J 61/30* (2006.01)

(52) U.S. Cl. .................. 313/634; 313/573; 313/493

(58) Field of Classification Search ............ 313/634, 313/493, 573
See application file for complete search history.

(56) References Cited

U.S. PATENT DOCUMENTS 2,743,388 A * 4/1956 Bartley ................. 313/634
5,034,655 A * 7/1991 Murayama et al. ......... 313/493
2005/0077829 A1* 4/2005 Iida et al. ................. 313/634

FOREIGN PATENT DOCUMENTS

| CN | 2534674 Y | 2/2003 |
|---|---|---|
| JP | 58-112238 | 7/1983 |
| JP | 1-173544 | 7/1989 |
| JP | 02-272485 | 11/1990 |
| JP | 7-65789 | 3/1995 |
| JP | 09-045283 | 2/1997 |
| JP | 09045283 A * | 2/1997 |
| JP | 10-134718 | 5/1998 |
| JP | 2003-263972 | 9/2003 |

* cited by examiner

*Primary Examiner*—Mariceli Santiago

(57) ABSTRACT

An arc tube is composed of an arc tube body that is formed by winding a straight glass tube. Two portions of the straight glass tube are spirally wound around an imaginary conical surface. The spiraled portions of the glass tube are sandwiched between a pair of movable fixed plates. The spiraled portions of the glass tube are heated to a temperature equal to or higher than a point at which the glass tube is deformable and yet lower than the softening point of the glass tube. The spiraled portions are flattened by the movable plate moving downwardly under its own weight.

8 Claims, 15 Drawing Sheets

FIG.5
(a)
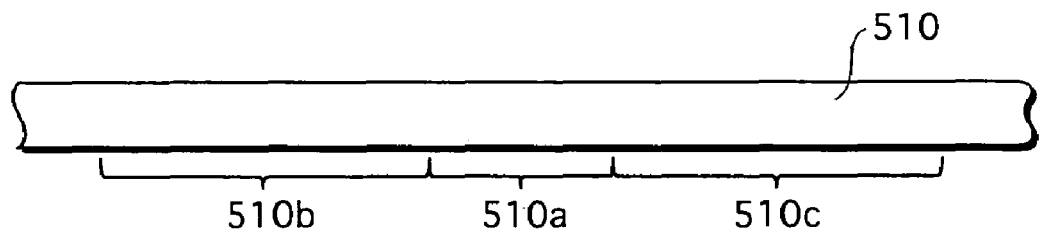
(b)
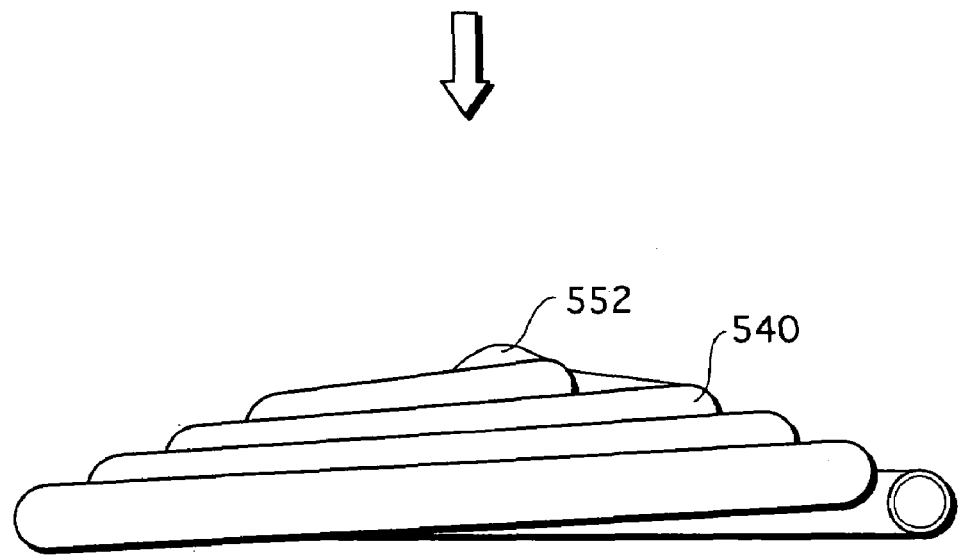
(c)
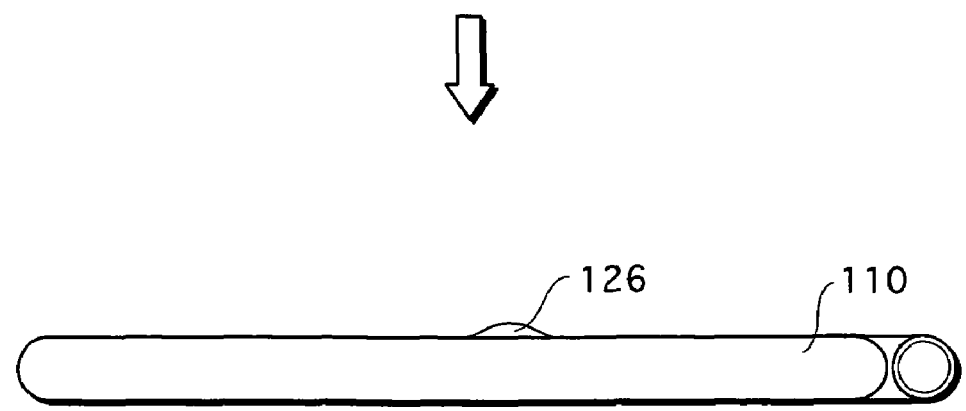

FIG.9
(a)
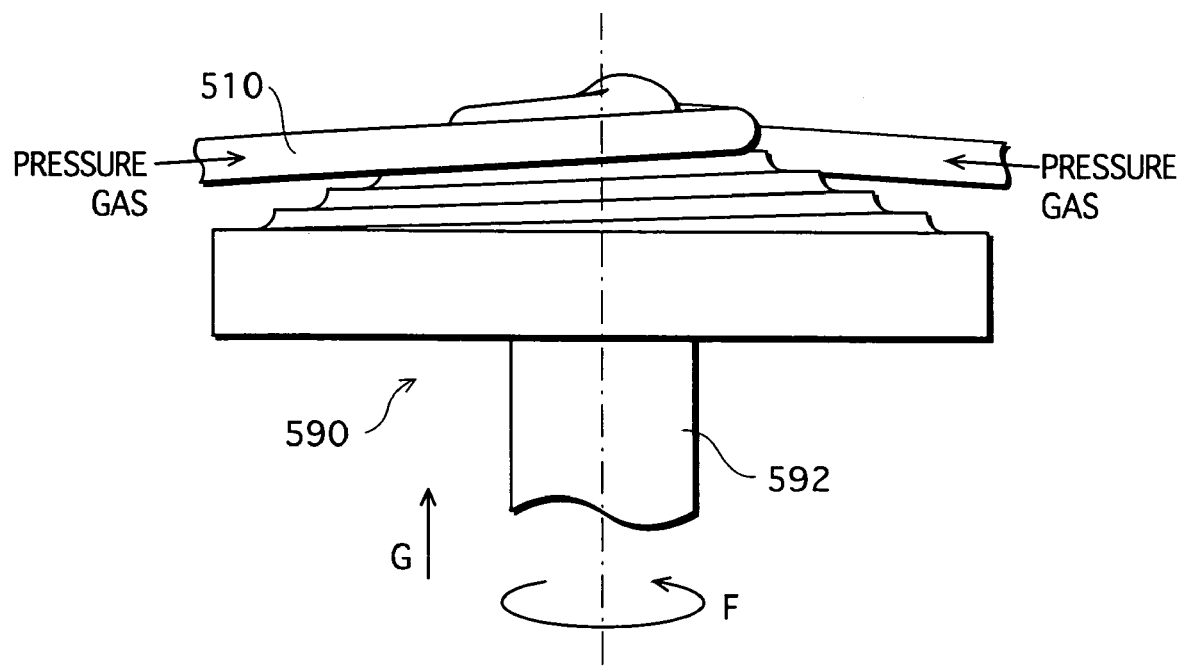
(b)
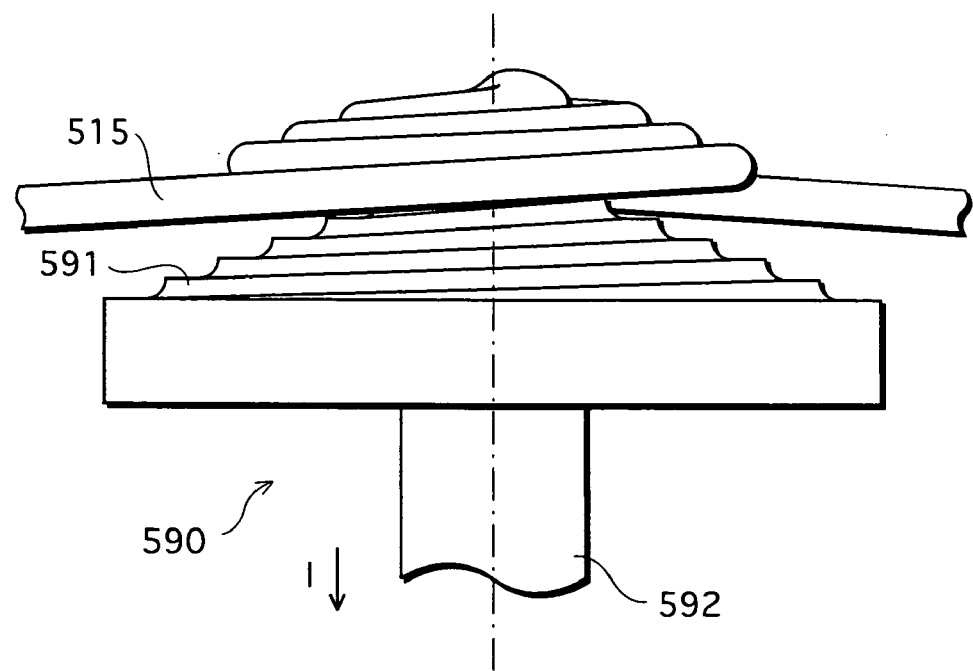

FIG.10
(a)
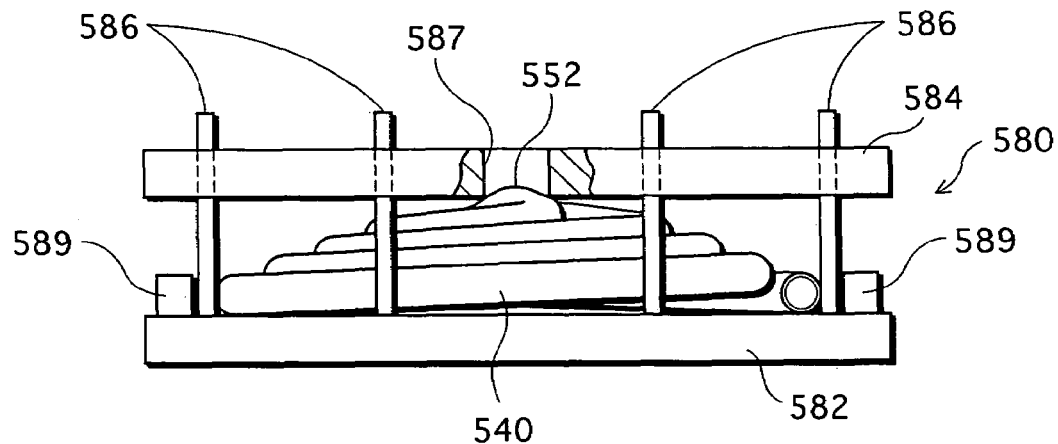
(b)
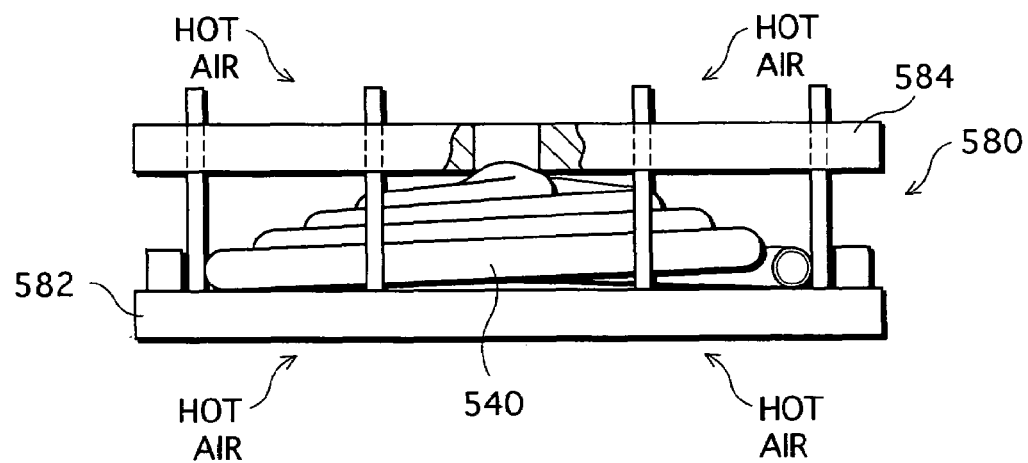
(c)
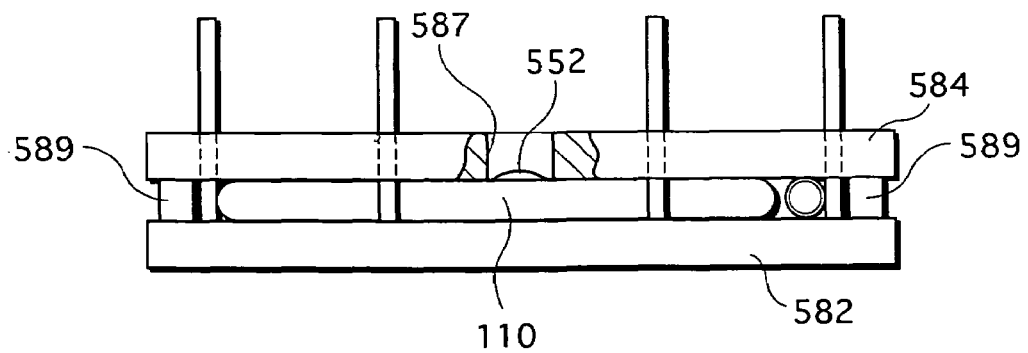

FIG.12

SUBJECTIVE EVALUATION OF UNEVENNESS IN FLUORESCENT LAMP BRIGHTNESS

| RATE RG OF GAP Ga TO OUTSIDE DIAMETER D1 | | RG≦0.3 | 0.3<RG≦0.4 | 0.4<RG≦0.5 | 0.5<RG |
|---|---|---|---|---|---|
| LEVELS OF UNEVENNESS IN BRIGHTNESS | NOT NOTICEABLE | ※ 19/20 | 2/20 | 0 | 0 |
| | NOT VERY NOTICEABLE | 1/20 | 17/20 | 1/20 | 0 |
| | RATHER NOTICEABLE | 0 | 1/20 | 16/20 | 3/20 |
| | NOTICEABLE | 0 | 0 | 3/20 | 17/20 |

NOTE: DENOMINATOR IS NO. OF EVALUATORS & FRACTION IS NO. OF EVALUATORS WHO CHECKED ON THE LEVEL

ARC TUBE FORMED FROM A GLASS TUBE AND HAVING A SPIRALLY WOUND SECTION WITHIN ONE PLANE

This application is based on an application No. 2003-394710 filed in Japan, the content of which is hereby incorporated by reference.

BACKGROUND OF THE INVENTION (1) Field of the Invention

The present invention relates to a manufacturing method of an arc tube composed of a glass tube having a spirally wound portion of which tube axis is contained within one plane. The present invention also relates to the arc tube, a low-pressure mercury lamp, and an illumination apparatus.

(2) Description of the Related Art

Low-pressure mercury lamps for general purpose illumination includes fluorescent lamps composed of a circular arc tube (hereinafter, "circular fluorescent lamp"). One feature of circular fluorescent lamps lies in the flatness in shape.

Recently, there has been a growing demand for downsizing circular fluorescent lamps. This is because the downsizing of a circular fluorescent lamp leads to downsizing of an illumination apparatus for use with the fluorescent lamp attached thereto.

One example of an arc tube that is smaller than conventional circular arc tubes is an arc tube composed of a glass tube that spirally winds toward an end thereof, around an imaginary axis farther and farther from the imaginary axis. The tube axis of the wound portion of the glass tube is contained within one plane. This shape is referred to as a "flat spiral", because the axis of the glass tube is contained within one plane. (See JP Patent Application Publication No. 09-92154.)

With the glass tube having a flat spiral shape, the space enclosed within the circular arc tube is effectively utilized. Thus, the arc tube may be made smaller in outermost diameter, without shortening the discharge distance in comparison with that of the conventional arc tube.

The arc tube having a flat spiral shape is formed through a molding step and a deforming step as follows. In the molding step, a softened glass tube is wound downwardly around the surface of a circular cone (this surface is referred to as an "imaginary conical surface"), and thus the glass tube winds farther and farther away from the axis of the imaginary conical surface (this axis is referred to as "imaginary axis"). This shape is referred to as a "stereo spiral", because the axis of the glass tube shifts in the direction of the imaginary axis as the grass tube spirals. In the deforming step, the spirally wound glass tube is heated throughout its length, so that the glass tube deforms under its own weight.

Unfortunately, however, there is a problem in the conventional method of manufacturing an arc tube into a flat spiral shape. According to the conventional method, upon flattening the wound portion of the glass tube in the direction of the imaginary axis, the glass tube is heated to its softening point in order to allow the glass tube to deform under its own weight. As a result, the wound portion of the glass tube fails to maintain its tubular shape. For this reason, it is often the case where the glass tube after the deforming is distorted in cross section, adjacent turns of the glass tube come into contact with each other, and the end portion of the glass tube tapers. In short, according to the conventional method, it is difficult to manufacture an arc tube in excellent design.

SUMMARY OF THE INVENTION

The present invention is made in view of the above problem and aims to provide a manufacturing method of an arc tube having a flat spiral shape in excellent design. The present invention also aims to provide the above arc tube, a low-pressure mercury lamp using the arc tube, and an illumination apparatus using the low-pressure mercury lamp.

To achieve the above aims, the present invention provides a manufacturing method of an arc tube, comprising: a winding step of spirally winding a glass tube around an imaginary conical surface; and a deforming step of heating a spiraled portion of the glass tube to a temperature equal to or higher than a point at which the glass tube is deformable and lower than a softening point of the glass tube, and deforming the spiral so that the spiraled portion has a tube axis substantially within one plane.

The glass tube may be spirally wound in part or throughout its length. The "part" used herein may refer to one or more portions of the glass tube. Furthermore, the spiraled portion of the glass tube may be compressed in part or thorough out its length. The "part" used herein may refer to one or more portions within the spiraled portion of the glass tube.

Note that the term "imaginary conical surface" used herein assumes the lateral surface(s) of a circular cone as well as of a pyramidal cone. The circular cone includes a circular cone, an elliptical cone, and so on. The pyramidal cone includes a triangular pyramid, a quadrangular pyramid, and soon. Note, in addition, that the term "deformable" refers to the state where the glass tube is plastic deformable.

According to the manufacturing method stated above, in the compressing step, the spiraled portion of the glass tube is heated to a temperature that is equal to or higher than a point at which the glass tube becomes deformable and yet lower than the softening point of the glass tube. Consequently, the glass tube is prevented from being distorted in cross section, making contact between adjacent turns, or being tapered at the end portion. Thus, the arc tube having a flat spiral shape is manufactured in excellent design.

Here, when seen from an axis of the imaginary conical surface, a minimum gap between adjacent turns of the spiraled portion before the deforming is not be smaller than 0.5 mm and not greater than 0.4 times an outside diameter D1 of the glass tube.

Note that the term "axis of the imaginary conical surface" refers to an axis of a circular or pyramidal cone defining the imaginary conical surface.

In another aspect, the present invention provides an arc tube comprising a glass tube having at least one portion spirally wound around an imaginary axis. The spiraled portion of the glass tube has a tube axis substantially within one plane perpendicular to the imaginary axis. A minimum gap between adjacent turns of the spiraled portion is not less than 0.5 mm and not greater than 0.4 times an outside diameter D1 of the glass tube in mm.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 5a-5c show views illustrating steps of manufacturing an arc tube body according to the preferred embodiment;

FIG. 9a-9b show views illustrating a molding step of the intermediate product;

FIG. 10a-10c show views illustrating a step of compressing the intermediate product to a substantially flat shape;

FIG. 12 is a table showing subjective evaluations of unevenness in the brightness of fluorescent lamps;

DESCRIPTION OF THE PREFERRED EMBODIMENT

The following describes a fluorescent lamp 10, which is a type of a low-pressure mercury lamp, as a preferred embodiment of the present invention.

I. Structure of Fluorescent Lamp

Figure 1:
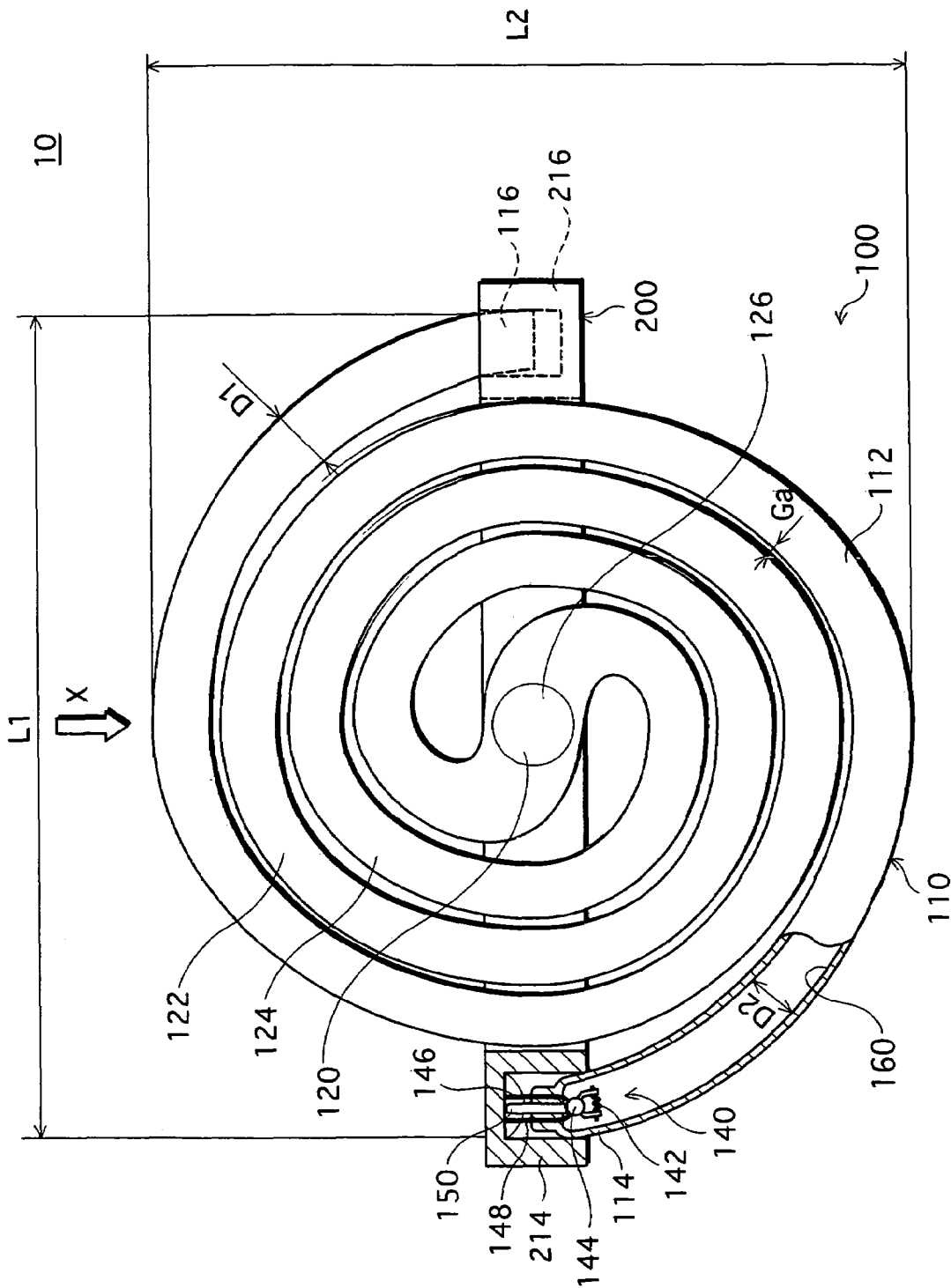
FIG. 1 is a front view showing a fluorescent lamp according to a preferred embodiment of the present invention, seen from its illumination side.
Figure 2:
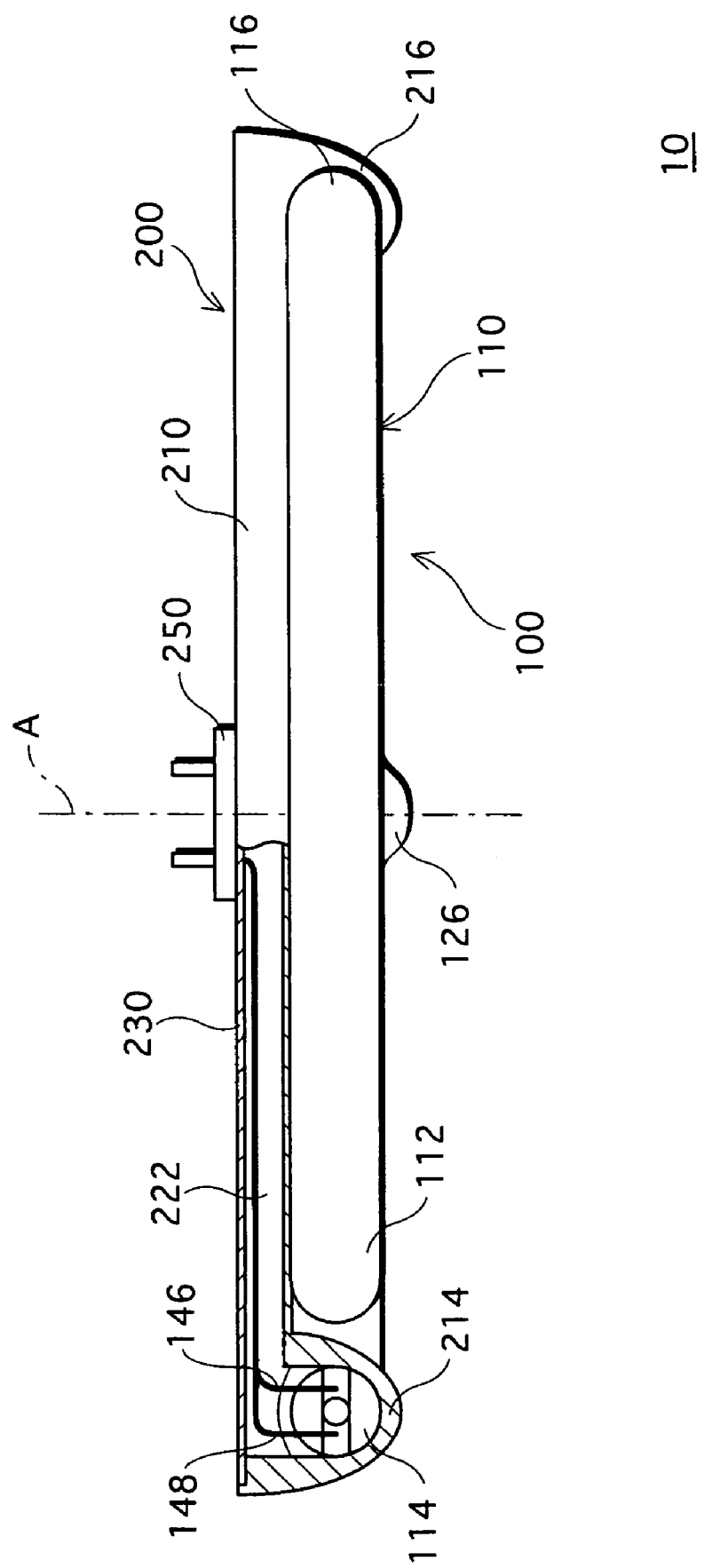
FIG. 2 is a partly-broken view of the fluorescent lamp shown in FIG. 1, seen from the direction of an arrow X to show the inside of a holder and an arc tube.

FIG. 1 is a front view showing the fluorescent lamp 10 of the preferred embodiment, seen from its illumination side. FIG. 2 is a partly-broken view of the fluorescent lamp 10 seen from the direction of an arrow X to show the inside of a holder 200 and an arc tube 100.

As shown in FIGS. 1 and 2, the fluorescent lamp 10 is generally composed of the arc tube 100 through which one discharge path is formed, and the holder 200 holding the arc tube 100. For electronic power supply, a later-described base 250 is mounted on the holder 200.

(1) Arc Tube

As shown in FIGS. 1 and 2, the arc tube 100 is composed of an arc tube body 110 and a pair of electrodes 140. The arc tube body 110 is formed of, for example, a straight glass tube 112 that is wound into a spiral form. The electrodes 140 are provided within the arc tube body 110 at hermetically-sealed ends 114 and 116. The arc tube body 110 is filled with mercury (in an amount of 5 [mg], for example), in addition to an argon gas serving as a buffer gas (at a pressure of 400 [Pa], for example).

Note that FIG. 2 does not show the electrode 140 that is provided at the end 116 of the arc tube body 110, for the convenience sake of the illustration. Each electrode 140 has an identical structure.

In addition, the mercury enclosed within the arc tube body 110 may be a simple substance or a mercury amalgam with zinc, tin, or bismuth-indium.

As shown in FIGS. 1 and 2, the glass tube 112 has a middle portion 120 and two wound portions 122 and 124. The wound portions oppositely extend from the middle portion 120 and spiral around an imaginary axis A, which will be described later.

The wound portions 122 and 124 of the glass tube 112 have the tube axis contained substantially within one plane that is substantially perpendicular to the imaginary axis A. The wound portions 122 and 124 wind farther and farther from the imaginary axis A toward the respective ends 114 and 116. In other words, the wound portions 122 and 124 form a flat spiral wound around the imaginary axis A.

As shown in FIGS. 1 and 2, the middle portion 120 has a bulge 126 at a position corresponding to the imaginary axis A of the spirally wound arc tube body 110, i.e. at the center of the middle portion 120. The bulge 126 protrudes in one direction of the imaginary axis A and serves as the cold spot during the time the fluorescent lamp 10 is operated. The cold spot is a point on the arc tube 100 where the temperature is lowest. This lowest temperature determines the pressure of mercury vapor within the arc tube 100 under the lamp operation.

The glass tube 112 may be made of barium-strontium silicate glass (lead-free glass) and substantially circular in cross section. Yet, the cross-sectional shape of the glass tube 112 is not limited to a circular shape. Alternatively, the glass tube 112 may be substantially elliptical in cross section. In any case, the arc tube body 110 has more or less an irregular cross-sectional shape, rather than a perfect circle. This is because the arc tube body 110 is formed into a flat spiral shape by softening and winding the straight glass tube 112.

As shown in FIG. 1, the arc tube body 110 when seen from the illumination side has a gap between each two adjacent turns of wound portions 122 and 124 in a direction perpendicular to the imaginary axis A (hereinafter, this perpendicular direction is referred to as a "radial direction").

Since the glass tube 112 is substantially circular in cross-section, the gap between each two adjacent turns of the wound portions 122 and 124 is smallest on the plane containing the tube axis of the wound portions of the glass tube 112. This smallest gap is denoted as a gap Ga.

At the ends 114 and 116 as well as their neighboring portions of the arc tube body 110, the gap between adjacent turns of the wound portions 122 and 124 is larger. The gap is made larger in order to prevent the nearby portions from being deformed when the ends 114 and 116 are heated to be sealed with the electrodes 140. Thus, the gap Ga is formed between any two adjacent turns of the wound portions 122 and 124, excluding the ends 114 and 116 and their neighboring portions. (The neighboring portions may be portions inwardly extending from the ends 114 and 116 to a point forming a radial angle of about 45° with the respective ends.)

As shown in FIG. 1, the inner surface of the arc tube body 110 is covered with a phosphor 160. The phosphor 160 is composed of, for example, red, green, and blue rare-earth phosphors, such as $Y_2O_3$:Eu, $LaPO_4$:Ce, Tb and $BaMg_2Al_{16}O_{27}$:Eu, and Mn.

Each electrode 140 is so-called "glass-bead mounting" type, and is composed of a tungsten electrode coil 142, a pair of lead wires 146 and 148 supporting the electrode coil 142 thereacross, and a glass bead 144 fixedly supporting the lead wires 146 and 148.

The pair of electrodes 140 is individually attached to the respective sealed ends 114 and 116 of the arc tube body 110 by partially embedding the lead wires 146 and 148 therein.

Specifically, part of the lead wires 146 and 148 extending from the glass bead 144 oppositely to the electrode coil 142 is embedded.

To one end of the arc tube body 110 (the end 114, in this embodiment), an exhaust pipe 150 is attached by sealing the end along with the electrode 140. The exhaust pipe 150 is used, after the electrode 140 is attached, for evacuating the arc tube body 110 or introducing a buffer gas into the arc tube body 110.

To sum up, the arc tube 100 is composed of the arc tube body 110 having: the phosphor 160 applied over its inner surface; the electrodes 140 attached by sealing the respective ends thereof; and the buffer gas enclosed therein. The ends 114 and 116 and the middle portion 120 are the terms referring to the portions of the arc tube body 110. Hereinafter, the same terms and numerals are used to refer to the corresponding portions of the arc tube 100. Similarly, the term "radial direction" of the arc tube body 110 is also used to refer to the radial direction of the arc tube 100.

Note that the arc tube 100 is attached to the holder 200 in a manner that the side having the bulge 126 faces away from the holder 200 (i.e. the bulge 126 is exposed at the illumination side).

(2) Holder

Figure 3:
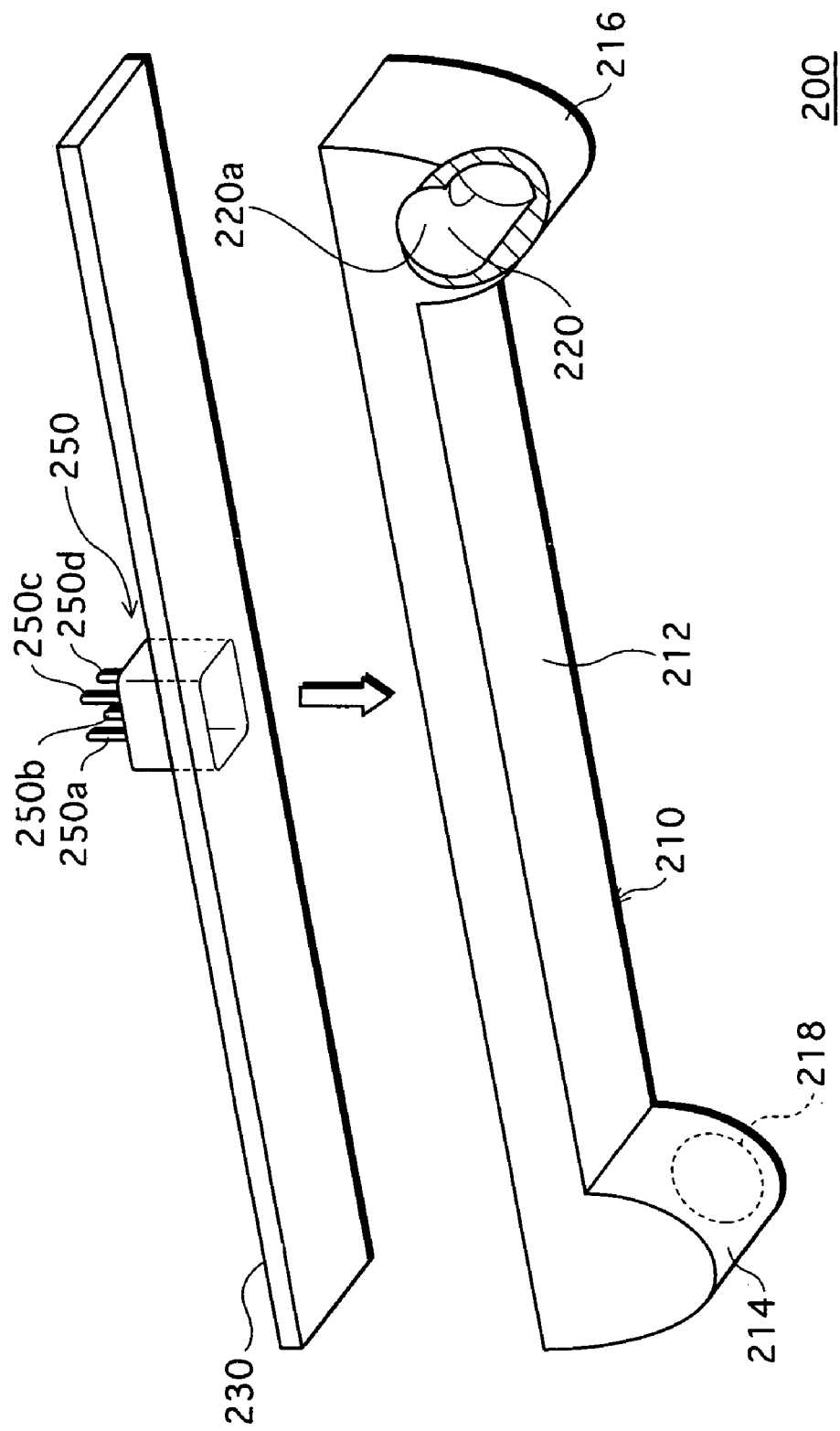
FIG. 3 is a disassembled, partly-broken oblique view of the holder shown in FIG. 2.

FIG. 3 is a disassembled, partly-broken oblique view showing the holder 200 according to the present embodiment.

As shown in FIGS. 1-3, the holder 200 is composed of a holding member 210 and a base-mounting member 230 for the mounting of the base 250. The base 250 has four connecting pins 250a, 250b, 250c, and 250d for connection with electronic power supply.

The holding member 210 is composed of a main body 212 of which longitudinal direction extends across the ends 114 and 116 of the arc tube 100. The main body 212 has projections 214 and 216 each at one of longitudinally opposing ends. The projections 214 and 216 have insertion holes 218 and 220 for inserting the ends 114 and 116 of the arc tube 100.

The insertion holes 218 and 220 each have an L shape composed of a first hole and a second hole. The first hole extends laterally of the projection 214 (216), and has a shape conforming to the profile of the end 114 (116) of the arc tube 100. The second portion bends from the first hole and extends toward the rear side of the main body 212 (i.e. extends upwardly).

With the above structure, the arc tube 100 is securely supported as a result of the surface engagement of the ends 114 and 116 against the inner surfaces 220a of the first hole (the inner surface of the insertion hole 218 is not illustrated in the figure). In addition, the pairs of lead wires 146 and 148 each extending from the ends 114 and 116 are directed to the rear side of the main body 212 through the upwardly extending second hole (See FIG. 2).

As shown in FIG. 2, the holding member 210 has a space 222 secured inside thereof. The space 222 allows the pairs of lead wires 146 and 148 each extending from the ends 114 and 116 of the arc tube 100 to be guided to the base 250. The base-mounting member 230 is fitted within the holding member 210 so as to close the space 222 from above. The base-mounting member 230 is fixed to the holding member 210 for example by an adhesive.

(3) Illumination Apparatus

Figure 4:
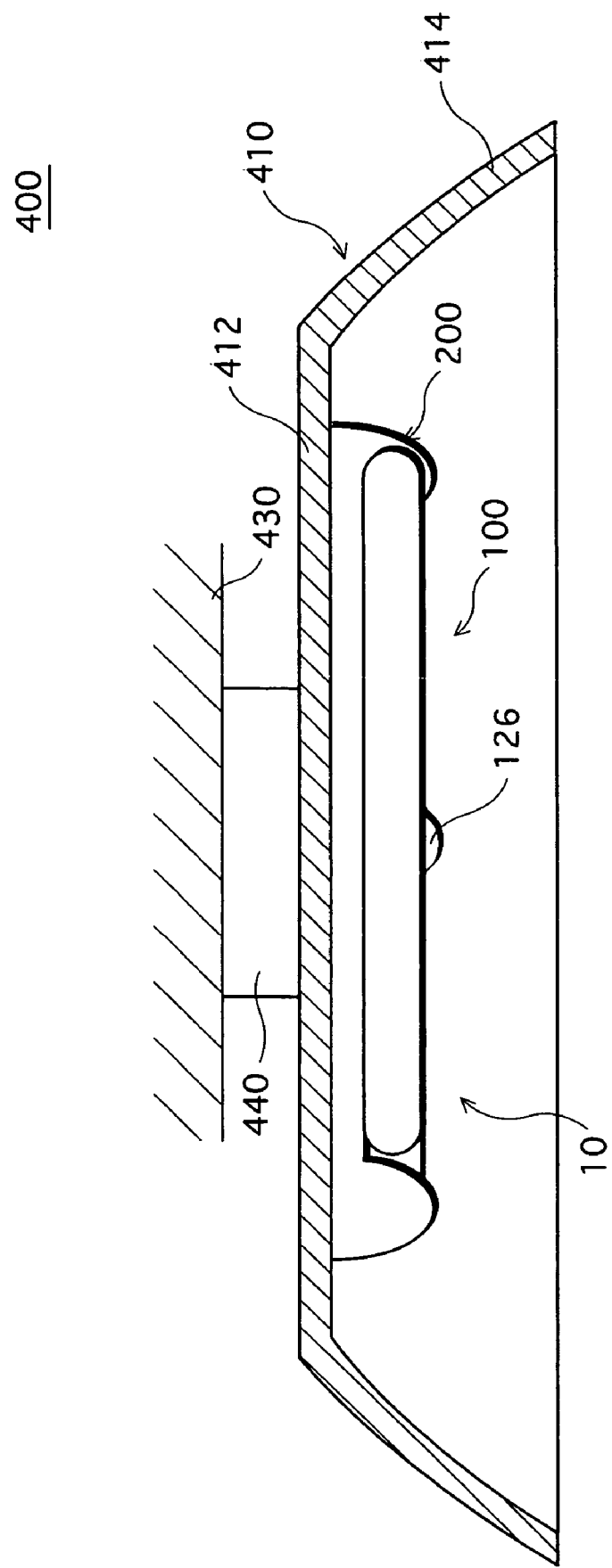
FIG. 4 is a partly-broken side view showing an illumination apparatus having the fluorescent lamp shown in FIG. 1.

FIG. 4 is a partly-broken side view showing an illumination apparatus 400 having the fluorescent lamp 10 of this embodiment.

As shown in the figure, the illumination apparatus 400 may be a ceiling-mounted type. A main body 410 of the illumination apparatus 400 is attached, for example, via a socket 440 to a rosette provided within a ceiling 430.

The main body 410 is composed of a shade 414 having a flat bottom 412 substantially at the center thereof. The fluorescent lamp 10 is removably attached inside the shade 414 onto the bottom 412. The socket 440 is provided on the outer surface of the bottom 412 of the shade 414. The socket 440 houses therein an electronic ballast (not illustrated) for lighting the fluorescent lamp 10.

The fluorescent lamp 10 is removably attached to the main body 410 by inserting the base 250 (see FIG. 2, for example) to another socket (not illustrated) provided inside the shade 414. Upon attachment, the fluorescent lamp 10 is brought into electrical connection. The electric ballast is of a series-inverter type dedicated for high-frequency.

The inner surface of the shade 414 may be a reflecting surface that reflects light emitted from the fluorescence lamp 10 to illuminate a desired direction, for example, a downward direction. The reflecting surface may be formed by applying a white paint or alumina particles over the inner surface of the shade 414.

When the electric ballast turns on the fluorescence lamp 10, the cold spot is formed at the bulge 126 of the arc tube 100. The arc tube 100 is designed such that the temperature at the cold spot (so-called cold spot temperature) under the steady state operation reaches a value that optimizes the pressure of mercury vapor for achieving the maximum lamp efficiency. The pressure of mercury vapor is regulated based on the cold spot temperature. This is because, as described above, the cold spot temperature uniquely determines the pressure of the mercury vapor under the steady state operation.

II. Specific Structure of Fluorescent Lamp

The fluorescent lamp 10 according to the present invention is provided in an attempt to downsize a conventional circular fluorescent lamp. First, a description is given to a conventional circular fluorescent lamp comparable to the fluorescent lamp 10. The conventional circular fluorescent lamp mentioned herein is a so-called "Circular 20" slim type, and is made of a glass tube of which outside diameter is 16 [mm]. The glass tube has a circular shape of which outside and inside diameters of the circle are 225 [mm] 192 [mm], respectively. In addition, the total luminous flux is 2310 [mm] and the rated operating life is 9000 [hr].

Now, a description is given to the specific structure of the fluorescent lamp 10. An outside diameter D1 of the glass tube 112 is 9.0 [mm] and an inside diameter D2 is 7.4 [mm] (See FIG. 1).

As stated above, the two wound portions 122 and 124 of the arc tube body 110 are spirally wound around the imaginary A, and the number of turns of the spiral is about 4.0 full turns in total. As shown in FIG. 1, the dimensions of the arc tube 100 are such that a length L1 connecting the ends 114 and 116 is 120 [mm], and a length L2 of the diametric distance perpendicular to the line segment connecting the ends 114 and 116 is 110 [mm]. The gap Ga between radially adjacent turns of the glass tube 112 is about 1.0 [mm].

That is to say, the outside diameter of the fluorescent lamp 10 is 0.53 times the outside diameter of the conventional circular fluorescent lamp. The height of the fluorescent lamp 10 including the bulge 126 is 11 [mm], which is 0.69 times the height of the conventional circular fluorescent lamp. The height of the fluorescent lamp 10 excluding the bulge 126 is equal to the outside diameter of the glass tube 112, which is 9 [mm] and is 0.56 times the height of the conventional fluorescent lamp.

The interelectrode distance of the above arc tube 100 is 700 [mm]. When the fluorescent lamp 10 composed of the arc tube 100 was turned on in a base-up position with a lamp input of 27 [W], the resulting luminance flux was 2220 [lm] and lamp efficiency was 82.2 [lm/W].

The luminous flux emitted by the fluorescent lamp 10 is slightly lower than the luminous flux of 2310 [mm] emitted by the conventional circular fluorescent lamp. Yet, the difference is negligible to regard them substantially equal.

In the lamp operation mentioned above, the bulb wall loading imposed on the arc tube 100 was 0.17 W/cm$^2$ and the rated operating life was 11,000 [hr]. The "rated operating life" used herein is determined based on testing. In the testing, a fluorescent lamp having the arc tube 100 was repeatedly turned on for 2.75 hours and turned off for 0.25 hours. The time at which the lamp no longer emit light was measured, as well as the time at which the total luminous flux was reduced to 60% or less of the total luminous flux measured after 100 hours of operation. The rated operating life hours were the shorter one of the time periods from the operation start to the two points of time measured.

Note that the rated operating life of the arc tube 100 is about 1.2 times longer than that of the conventional circular fluorescent lamp, which is 9000 [hr].

III. Manufacturing Method of Arc Tube

Now, a description is given to a manufacturing method of the arc tube 100 having the above structure.

FIG. 5 is a view illustrating steps of manufacturing an arc tube body.

The manufacturing method described herein is for manufacturing the arc tube body 110 described above. First, the flow of manufacturing steps is explained briefly, and then each step is explained in detail.

First of all, as shown in (a) of FIG. 5, a straight glass tube 510 is prepared. The glass tube 510 is heated to be softened, and then spirally wound around an imaginary conical surface of a molding jig 590, which will be described later. As a result, the glass tube 510 is formed into an intermediate product 540 having a spirally wound portion. As shown in (b) of FIG. 5, the intermediate product 540 is substantially conical in outline, when seen from a direction perpendicular to the axis of the molding jig.

In the next step, the intermediate product 540 is heated again, and compressed in the axial direction of the imaginary conical surface to flatten the wound portion. As a result, the arc tube body 110 having a flat spiral shape is formed.

Note that the term "flat" used herein refers to a shape of that the thickness of the arc tube body is substantially equal to the outside diameter of the glass tube, when seen from a direction perpendicular to the axis of the molding jig at the time of the molding.

Thereafter, the arc tube body 110 is subjected to a step of applying a phosphor coating to the inner surface of the tube, a sealing step of attaching the electrodes by sealing each end of the tube, and a gas enclosing step of enclosing mercury and an argon gas inside the arc tube body 110. Yet, these steps are carried out according to conventional techniques. Thus, the description thereof is omitted.

Hereinafter, a description is given to a molding step of a conical intermediate product (equivalent to the winding step of the present invention) and to a compressing step of the intermediate product flat (equivalent to the deforming step of the present invention).

(1) Molding Step of Intermediate Product

A. Glass Tube

First of all, a description is given to the glass tube 510. Before the winding, the glass tube 510 is straight and has three portions 510a, 510b, and 510c in the longitudinal direction, as shown in (a) of FIG. 5. The portions 510b and 510c are portions to be subjected to the winding. The portion 510a is the remaining portion between the two portions 510b and 510c, and referred to as a middle portion. When processing the glass tube 510 into the intermediate product 540, the middle portion 510a and at least part of the portions 510b and 510c are softened by heat. The glass tube 510 is substantially circular in cross section, 9.0 [mm] in outside diameter, 7.4 [mm] in inside diameter, and 1500 [mm] in entire length.

B. Intermediate Product

The intermediate product 540 is formed by winding the middle portion 510a and the portions 510b and 510c of the glass tube 510.

Figure 6A:
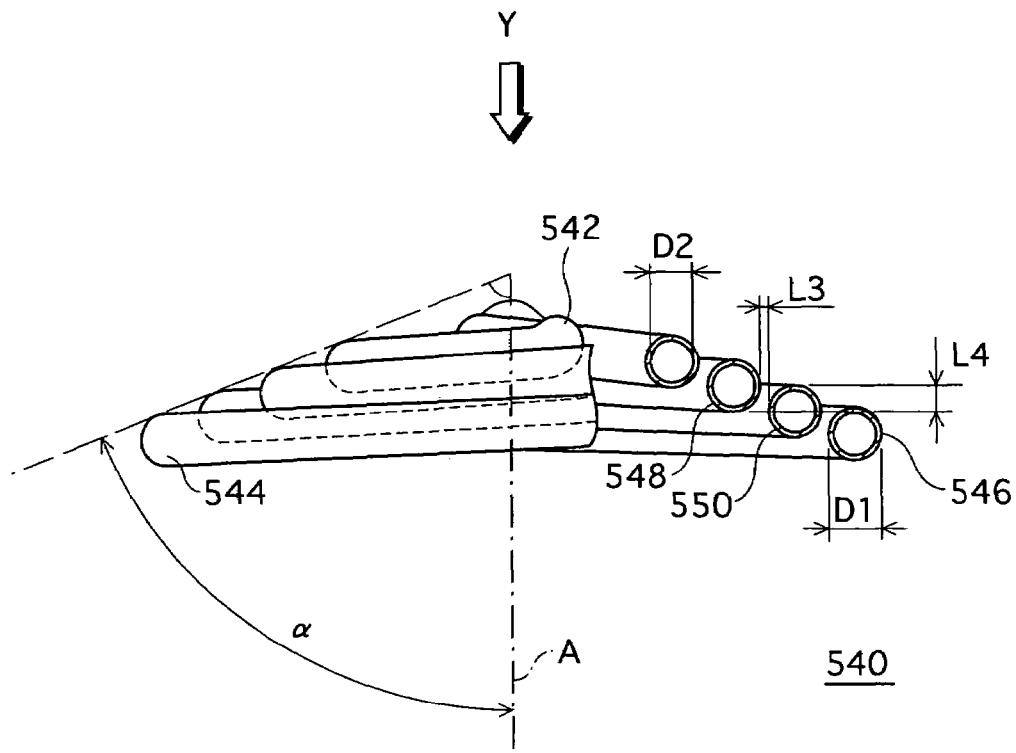
FIG. 6A is a partly broken view of an intermediate product shown in FIG. 5(b)
Figure 6B:
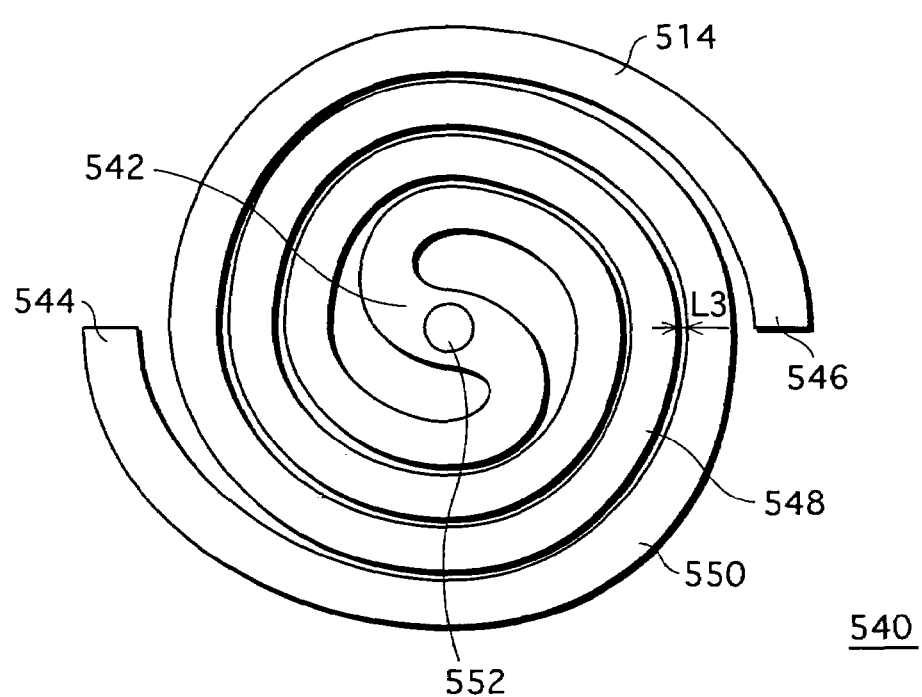
FIG. 6B is a front view of the intermediate product seen from the direction of an arrow Y shown in FIG. 6A

FIG. 6A is a partly broken view of the intermediate product 540 shown in (b) of FIG. 5. FIG. 6B is a front view of the intermediate product 540, seen from the direction of an arrow Y shown in FIG. 6A.

As shown in FIGS. 6A and 6B, the intermediate product 540 has two wound portions 548 and 550 and a middle portion 542 connecting the two wound portions 548 and 550. The wound portions 548 and 550 are formed by winding the portions 510b and 510c of the glass tube 510, and the middle portion 542 corresponds to the middle portion 510a of the glass tube 510.

The wound portions 548 and 550 are formed by winding the portions 510b and 510c of the glass tube 510 downwardly toward the respective ends, around the imaginary conical surface of the molding jig. Thus, the wound portions 548 and 550 spiral farther and farther from the middle portion 510a in the direction of the imaginary axis (the downward direction in FIG. 6A), and from the imaginary axis in the radial direction. (Note that during the winding of the glass tube, the imaginary axis coincides with the axis of the molding jig having an imaginary conical surface. The imaginary axis is equivalent to the imaginary axis of the conical surface of the present invention.) Thus, the intermediate product 540 has a substantially conical shape in its outline. The generating line and the axis of conical shape form an angle of 60°, which is denoted as "α" in FIG. 6A.

The positional relation between the wound portions 548 and 550 is such that a gap is formed between each two radially adjacent turns of the wound portions 548 and 550, when seen from the extending direction of the imaginary axis A (i.e. the direction of the arrow Y shown in FIG. 6A). FIG. 6B shows the intermediate product 540 from the direction of the arrow Y. The minimum length L3 of the gap is 1.0 [mm].

Further, when seeing the intermediate product 540 from the direction perpendicular to the imaginary axis A (as shown in FIG. 6A), each turn of the wound portions 548 and 550 partially overlap an immediately inside turn in the direction of the imaginary axis A. The length L4 of the height of overlapping portion is 4.0 [mm]. The number of turns of the wound portions 548 and 550 is four in total.

C. Jig for Forming Intermediate Product

The molding jig 590 has the imaginary conical surface, and is provided with a pair of latching members 593 and 594. The intermediate product 540 is formed by placing the middle portion 510a of the softened glass tube 510 between the pair of latching members 593 and 594, and then winding the portions 510*b* and 510*c*.

Figure 7:
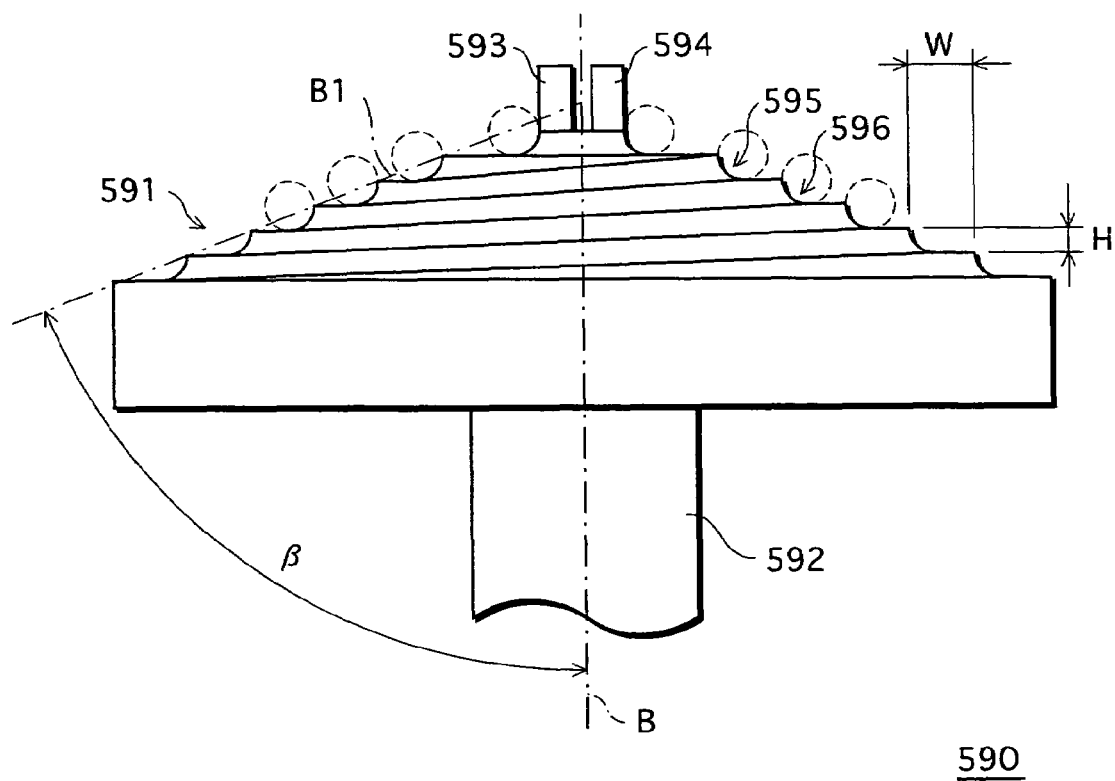
FIG. 7 is a side view of a molding jig.

FIG. 7 is a side view of the molding jig 590.

As shown in the figure, the molding jig 590 is composed of a main body 591 and a columnar mounting portion 592 for mounting the molding jig 590 to a driving device (not illustrated). The softened glass tube 510 is wound around the outer surface of the main body 591. The axes of the main body 591 and the mounting portion 592 coincide. In FIG. 7, the two axes are collectively illustrated as the axis of the molding jig 590 and denoted by the reference sign "B". In the following description, a direction perpendicular to the axis B is referred to as the "radial direction".

The latching members 593 and 594 are provided upright at the top of the main body 591 in diametrically opposed positions. In addition, two grooves 595 and 596 are formed along the main body 591 from the top to the bottom in a manner defining one continuous spiral. The grooves 595 and 596 receive therein the portions 510*b* and 510*c* of the glass tube 510.

The latching members 593 and 594 are spaced by an amount to allow the glass tube 510 to be fit therebetween. Each of the latching members 593 and 594 extends out from the top of the molding jig 590 in a direction parallel to the axis B. The latching members 593 and 594 may be a pair of rod-like members, such as pins, mounted to the molding jig 590 in parallel to the axis B.

The rod-like members used in this embodiment are circular in cross-section. Yet, the rod-like members may have any other shape as long as the surfaces to contact with the glass tube 510 are circular. In addition, the rod-like members may be tapered or gradually thinner toward the end (upper end).

That is to say, the latching members 593 and 594 may be in any shape ensuring the glass tube 510 not to be snagged at the time of disengaging the glass tube 510 from the molding jig 590 in the axial direction (for example, by moving the molding jig 590 downward).

Figure 8:
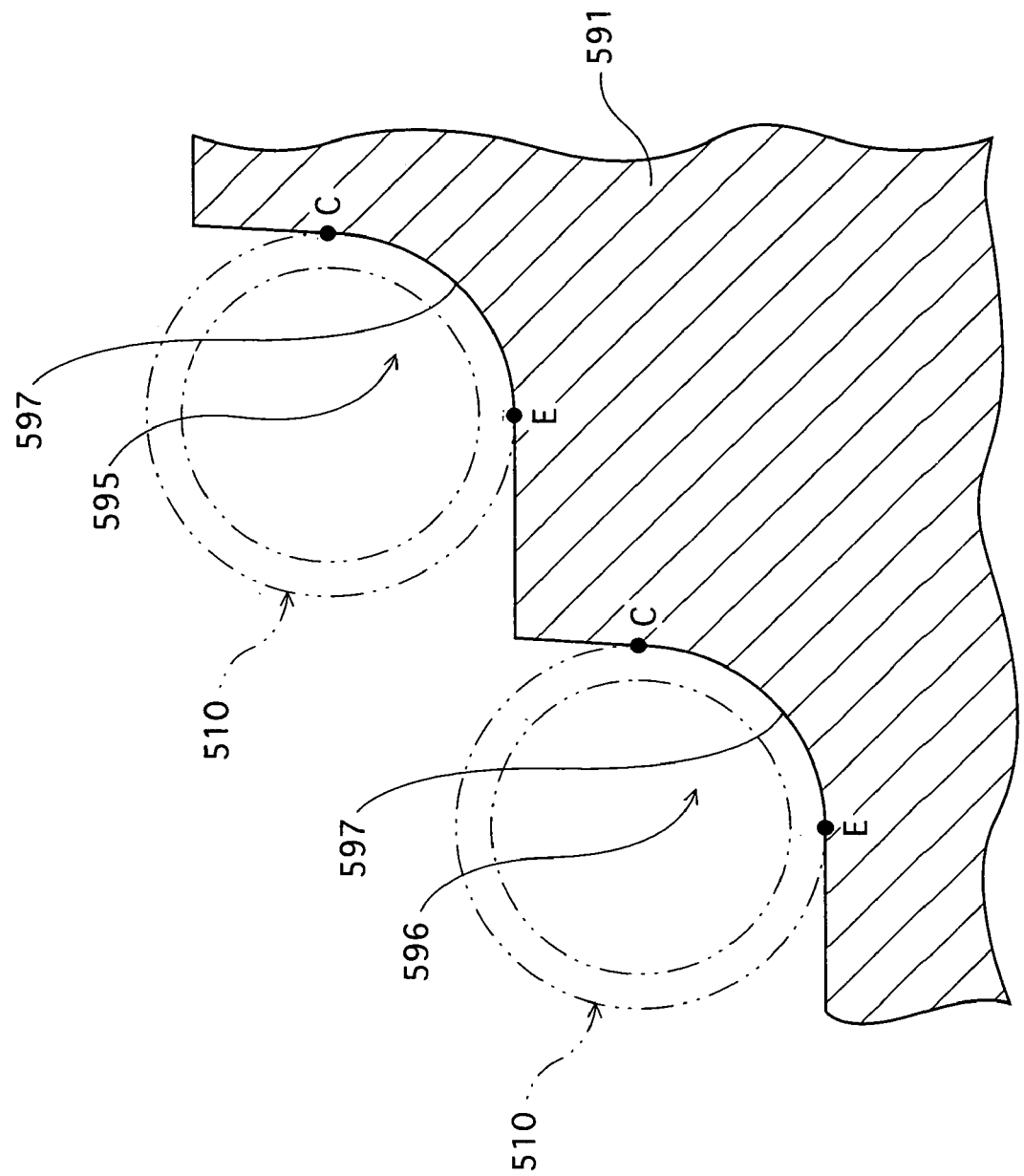
FIG. 8 is an enlarged cross-sectional view of grooves.

FIG. 8 is an enlarged cross-sectional view of the grooves 595 and 596.

As shown in FIG. 8, the grooves 595 and 596 are formed in the outer surface of the main body 591 and a staircase shape. In cross section, the grooves 595 and 596 each define a rounded corner 597 of which curvature is equal to that of the outer circumference of the glass tube 510 (shown in FIG. 8 in phantom lines).

With the above structure, the glass tube 510 is brought into surface contact with the round corner 597 at part as follows. First, the cross-sectional face of the glass tube 510 is bounded by two diametrical lines, one parallel to, and the other perpendicular to the axis B. The contacting surface is the lower quadrant of the outer circumferential surface that is closer to the axis B (the line segments C-E in FIG. 8). This structure prevents that the glass tube 510 wound around the molding jig 590 easily comes off from the grooves 595 and 596.

Here, since the glass tube 510 wound around the molding jig 590 has a substantially conical shape, the outer surface of the main body 591 substantially defines a conical shape and thus considered as the imaginary conical surface (equivalent to the imaginary conical surface of the present invention).

Next, a description is given to the specific structure of the molding jig 590. The molding jig 590 described herein is for manufacturing the arc tube body 110 described in the above section of "2. Specific Structure of Fluorescent Lamp". The height H (see FIG. 7) of each of the grooves 595 and 596 is about 0.56 times the outside diameter D1 of the glass tube 510. The reason for determining the height H as such is described later.

The inventors of the present invention have found the following, based on testing. When the height H is at least 0.5 times the outside diameter of the glass tube 510, the winding is carried out without such an occurrence that the glass tube 510 comes off from the grooves 595 and 596 of the molding jig 590. Thus, the winding is carried out with high manufacturing yield.

Furthermore, the width W (i.e. overhang) of each of the grooves 595 and 596 is larger by about 1.0 [mm] than the outside diameter D1 of the glass tube 510. The reason for determining the width W as such is described later.

An angle β formed between the generating line B1 and the axis B both of the imaginary conical surface is about 60°.

To sum up the above, the pitch of the grooves 595 and 596 in the axial direction is equal to a value calculated by subtracting L4 from D1, where D1 is the outside diameter of the glass tube 510, and L4 is the height of the overlapping portion of adjacent turns of the wound portions 548 and 550 (see FIG. 6A). Further, the pitch of the grooves 595 and 596 in the radial direction is equal to a sum of D1 and L3, where D1 is the outside diameter of the glass tube 510, and L3 is the width of the gap between adjacent turns of the wound portions 548 and 550.

D. Forming Step of Intermediate Product

FIG. 9 is a view illustrating the molding step for obtaining the intermediate product 540.

As shown in the figure, the mounting portion 592 of the molding jig 590 is attached to the driving apparatus, which is not shown in the figure. The driving apparatus is capable of moving the molding jig 590 in the direction of G shown in (a) of FIG. 9, while rotating the molding jig 590 on the axis B in the direction of F also shown in the figure.

Next, the glass tube 510 is heated at least partially (at least part of each of the portions 510*a*, 510*b*, and 510*c*), for example, in a furnace to a temperature of 800° C.±20° C. As a result, the heated part of the glass tube 510 is softened.

The middle portion 510*a* of the softened glass tube 510 is generally centrally inserted between the pair of latching members 593 and 594 of the molding jig 590. As shown in (a) of FIG. 9, each end of the glass tube 510 is grasped in place. Under this state, the molding jig 590 is rotated on the axis B in the direction of F and concurrently moved in the direction of G.

As a result, the middle portion 510*a* of the glass tube 510 is fixed by the latching members 593 and 594, and the two portions 510*b* and 510*c* are wound along the grooves 595 and 596 (i.e. around the imaginary conical surface).

Under this state, the grooves 595 and 596 receive the glass tube 510 and thus in surface contact with the outer circumference of the glass tube 510 at the point C on the receiving surface, as shown in phantom lines in FIG. 8. The contact prevents detachment of the glass tube 510 from the grooves 595 and 596.

Note that the movement amount of the molding jig 590 in the direction of G per rotation is equal to the total height of the grooves 595 and 596, i.e. twice the height H. During the rotation, a gas such as nitrogen or argon is introduced into the glass tube 510 at a controlled pressure. As a result, the wound portion of the grass tube 510 comes to have a circular cross section.

After completing the winding around the molding jig 590, the glass tube 510 is left to stand until the temperature lowers and the glass tube 510 hardens. Then, the hardened glass tube, which is denoted by a reference numeral 515, is removed from the molding jig 590 in the axial direction.

To be more specific, as shown in (b) of FIG. 9, the molding jig 590 may be axially moved downward in the direction of I while the glass tube 515 is kept in place. Alternatively, the glass tube 515 may be moved in the reverse direction of the direction I (in the G direction) while the molding jig 590 is kept in place. Alternatively, both the glass tubes 515 and the molding jig 590 may be moved.

Note that when forming a plurality of glass tubes 510 one after another, the molding jig 590 needs to be brought back to its initial position. Thus, it is advantageous in terms of manufacturing efficiency to move the molding jig 590 downward in the direction I.

After removal from the molding jig 590, the glass tube 515 is cut off its unnecessary portion, thereby the glass tube 515 is formed into the intermediate product 540.

At the apex of the intermediate product 540, a protrusion 552 is formed. The protrusion 552 later serves as the bulge 126 of the arc tube 100. The protrusion 552 is formed by locally softening the apex of the intermediate product 540 and increasing the internal pressure of the intermediate product 540. The protrusion 552 maybe formed immediately after winding the glass tube around the molding jig 590 or after removing the glass tube from the molding jig 590.

(2) Compressing Step of Intermediate Product

Next, a description is given to the step of compressing the substantially conical intermediate product to flatten, thereby obtaining a complete arc tube body.

FIG. 10 is a view illustrating the step of compressing the intermediate product to a substantially flat shape.

This step is carried out using a compressing jig 580 as shown in (a) of FIG. 10. Thus, a description is given first to the compressing jig 580, and then to the compressing step.

A. Compressing Jig

Figure 11:
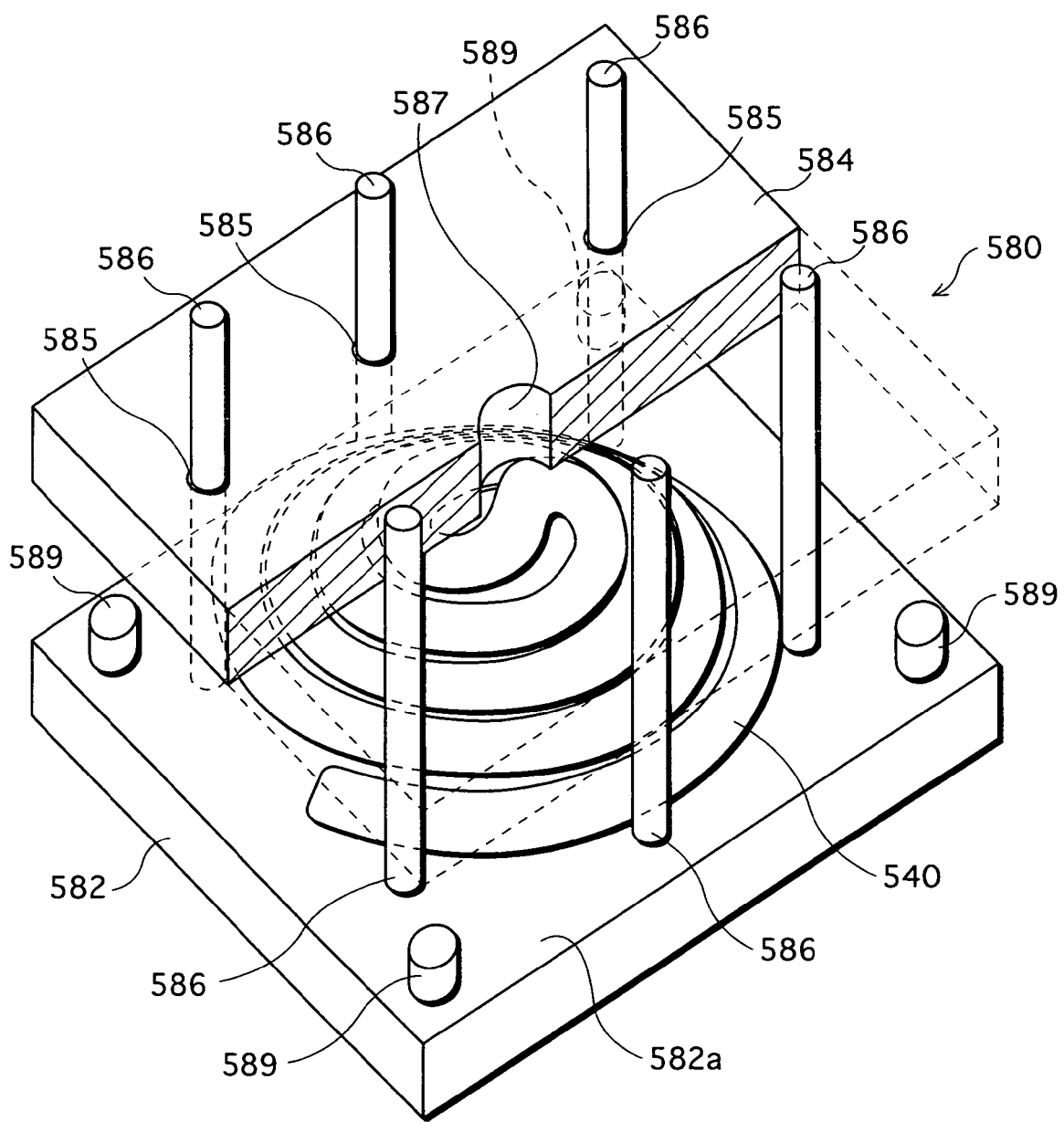
FIG. 11 is a partly-broken oblique view of the compressing jig along with the intermediate product.

FIG. 11 is a partly-broken oblique view of the compressing jig 580 on which the intermediate product is placed.

As shown in FIGS. 10 and 11, the compressing jig 580 has such a structure for sandwiching the intermediate product 540 in the direction of the imaginary axis A (the up and down direction in FIG. 11). To this end, the compressing jig 580 is provided with a pair of upper and lower plates and a plurality of guide pins 586. The pair of plates move along the guide pins 586 closer to or farther from each other, while maintaining their opposing surfaces in spaced parallel relation. Specifically, the lower plate is a fixed plate 582 having a placement surface 582a for placing the intermediate product 540 thereon. The upper plate is a movable plate 584 that is movable along the guide pins 586 in the direction perpendicular to the placement surface 582a of the fixed plate 582 (in the up and down direction in FIG. 11).

The plurality of guide pins 586 is, for example, six guide pins that are provided upright on the fixed plate 582 in a circumferentially spaced relation along the outermost circumference of the intermediate product 540. In addition, stoppers 589 are provided on the fixed plate 582 along the periphery of the placement surface 582a (In the example shown in FIG. 11, the placement surface 582a is rectangular, so that the stoppers 589 are provided each at one of the four corners). By the presence of the stoppers 589, the movable prate 584 is regulated from coming too close to the fixed plate 582.

The movable plate 584 has a through hole 587 generally at a center thereof, for accommodating the protrusion 552. The movable plate 584 also has six guide holes 585 at positions corresponding to the guide pins 586.

Now, a description is given to the specific structure of the compressing jig 580.

The fixed plate 582 and movable plate 584 are each made of stainless steel and substantially square in plan view. The movable plate 584 weighs about 1.2 [Kg].

The guide pins 586 have an outside diameter of 2.5 [mm] and provided on the fixed plate 582 at circumferential intervals of 35 [mm]. The diameter of each guide hole 585 is 2.6 [mm].

B. Compressing Step

Now, a description is given to the compressing step of flattening the intermediate product 540.

First of all, the compressing jig 580 is prepared, and the intermediate product 540 is placed between the plates 582 and 584, as shown in (a) of FIG. 10. For easy placement of the intermediate product 540, the movable plate 584 may be detached or moved upward to secure a wide space between the plates 582 and 584.

The intermediate product 540 is placed in a predetermined position on the placement surface 582a of the fixed plate 582. For example, the intermediate product 540 is placed generally at the center of the placement surface 582a. When the intermediate product 540 is properly placed, the protrusion 552 of the intermediate product 540 comes to enter the thorough hole 587 upon downward movement of the movable plate 584. At this time, the peripheral wall of the through hole 587 engages against the middle portion 542 of the intermediate product 540.

Next, while maintaining the engagement of the movable plate 584 against the middle portion 542, the intermediate product 540 is heated as shown in (b) of FIG. 10, until the outer peripheral surface of the glass tube reaches about 600° C. The reason for determining the target temperature as such will be described later.

Note that the intermediate product 540 is made of glass (soft glass) of which softening point is 675° C. When reaching temperatures equal to or higher than the softening point, the intermediate product 540 starts to deform under its own weight and thus becomes flattened. Upon the deforming, the glass tube tends to undergo distortion in its cross sectional shape.

When the temperature of the outer circumferential surface of the glass tube reaches about 600° C., the intermediate product 540 becomes deformable by force. As a consequence, the movable plate 584 starts to descend (move toward the fixed plate 582) under its own weight, thereby compressing and deforming the intermediate product 540 in the direction of the imaginary axis. The intermediate product 540 is continually deformed until the movable plate 584 engages against the stoppers 589 of the fixed plate 582.

When the movable plate 584 comes to engage against the stoppers 589, the intermediate product 540 is flattened except for the protrusion 552 accommodated in the through hole 587, as shown in (c) of FIG. 10. As a result, the arc tube body 110 having flat wound portions 122 and 124 is obtained.

The arc tube body 110 manufactured according to the above manufacturing method is deformed flat by force at a temperature lower than the softening point of the glass tube 510. That is to say, throughout the deforming process, the glass tube retains its rigidity to an extent of maintaining its tubular shape. As a result, unlike the conventional technique, the conical intermediate product 540 is deformed flat without such problems as distortion of the glass tube in cross section or axial prolongation of the glass tube.

Furthermore, the compressing jig used for deforming the intermediate product 540 exploits the weight of the movable plate 584 and thus is relatively simple in structure. This simple structure of the jig helps to reduce the manufacturing cost of the arc tube body 110.

Note that the intermediate product 540 is deformed in the direction of the imaginary axis without causing distortion of the glass tube in cross section. This is because the force required to distort the glass tube in cross section is greater than the force recurred to deform (compress) the intermediate product 540 in the direction of the imaginary axis.

IV. Assembling Fluorescent Lamp

Next, a description is given to assembling the arc tube 100 manufactured in the above-described manner and the holder 200 into a fluorescent lamp.

First, the arc tube 100 and the holder 200 are prepared. The arc tube 100 is attached to the holder 200 by inserting the ends 114 and 116 into the respective insertion holes 218 and 220 formed through the holding member 210. Then, the ends 114 and 116 are secured within the insertion holes 218 and 220 by adhesive such as silicon resin. The holder 200 at this stage is not yet attached to the base-mounting member 230.

Next, the lead wires 146 and 148 extending from the ends 114 and 116 of the arc tube 100 are routed thorough the connecting pins 250a, 250b, 250c, and 250d of the base 250 that is attached to the base-mounting member 230. The lead wires 146 and 148 other than the part routed through the pins are placed into the space 222. Then, the base-mounting member 230 is attached on the rear side of the holding member 210, and the connecting pins 250a, 250b, 250c, and 250d are swaged. This completes the fluorescent lamp 10.

V. Gap between Adjacent Turns of Glass Tube

The arc tube 100 described above is designed so that the minimum gap Ga between radially adjacent turns is 1 [mm]. However, the gap Ga may be any size not exceeding 0.4 times the outside diameter D1 of the glass tube 112. The reason for determining the minimum gap Ga as such is described below.

The fluorescent lamp 10 according to the present invention is expected to be applied to a thin ceiling-mounted type illumination apparatus for store lighting as well as home lighting. Especially, the fluorescent lamp 10 is expected to be applied more often to illumination apparatuses of an open type than a closed type. Thus, it is often the case that users directly view the fluorescent lamp that is mounted to an open-type illumination apparatus. With this being the situation, it is important to ensure the unevenness in the fluorescent lamp brightness due to the gap Ga is not noticeable.

To this end, the inventors of the present invention manufactured arc tubes each having a different size of gap Ga between adjacent turns of the glass tube 112. Then, fluorescent lamps having those arc tubes were mounted to illumination apparatuses of a downwardly open type. The illumination apparatuses then turned on to measure unevenness of the brightness.

The glass tube constituting each arc tube body of the fluorescent lamps used in the measurement was 9.0 [mm] in outside diameter, 7.4 [mm] in inside diameter, and 700 [mm] in length. The glass tube was spirally wound, so that the gap between adjacent turns fell within a range of 0.05 to 1.2 times the outside diameter of the glass tube. To be more specific, there were glass tubes with a gap of 24 different sizes within the above-specified range in increments of 0.05 (i.e. 0.05, 0.1, 0.15, 0.2 . . . 1.15, 1.2).

The evaluations of unevenness of the brightness were made in the following manner. First, the fluorescent lamps were installed in ceiling-mounted illumination apparatuses. The ceiling was at the height of 3 [mm] from the floor and each illumination apparatus had the height of 25 [mm]. The state of illumination of each lamp was subjectively observed by 20 evaluators (ranging from 150 [mm] to 180 [mm] tall) while walking around on the floor. Unevenness of the brightness was rated on a scale of the following four levels: Not Noticeable; Not Very Noticeable; Rather Noticeable; and Noticeable.

FIG. 12 shows a table of the evaluations by the evaluators.

As apparent from the table, unevenness of the brightness was not very noticeable when the gap Ga between adjacent turns of the glass tube was equal to or less than 0.4 times the outside diameter of the glass tube. Furthermore, unevenness of the brightness was not very noticeable when the gap Ga was equal to or less than 0.3 times the outside diameter of the glass tube.

On the other hand, when the gap Ga was larger than 0.4 times the outside diameter of the glass tube, unevenness of the brightness was rather noticeable. When the gap Ga was larger than the 0.7 times, the unevenness was obviously noticeable.

Based on the above evaluations, when the gap Ga is equal to or less than 0.4 times the glass tube 112, unevenness of the brightness is kept to a negligible level. Furthermore, by restricting the gap Ga to such a size is advantageous in terms of downsizing the arc tube 100.

Note that when the gap Ga of is equal to or less than 0.5 [mm], the possibility increases that adjacent turns of the glass tube 112 come into contact upon compressing and deforming the intermediate product.

VI. Supplemental Notes (1) Temperature of Intermediate Product

In the above description, the target temperature of the intermediate product 540 at the time of the compressing step is 600 [° C.] (hereinafter, the target temperature may also be referred to as "compressing temperature"). Yet, the compressing temperature may be any temperature that is equal to or higher than the temperature at which the glass tube 112 becomes deformable without cracking (550 [° C.], according to testing) and yet lower than the softening point of the glass tube 112 (675 [° C.]).

When the compressing temperature becomes equal to or higher than the softening point of the glass tube 112, the glass tube 112 is softened and no longer capable of maintaining its shape. As a result, the glass tube 112 is distorted thereby causing the problems as follows. For example, the glass tube 112 may no longer be substantially circular in its cross-section, adjacent turns of the glass tube 112 may come into contact, or the glass tube 112 is tapered at the end and thus prolonged in the axial direction.

In practice, it is preferable to determine the compressing temperature in consideration of variations in the glass tube material as well as in the temperature of the intermediate product 540. Thus, the compressing temperature may be higher by 40 [° C.] than the temperature at which the glass tube becomes deformable, and lower by 40° C. than the softening temperature. Within this temperature range (590 [° C.] to 635 [° C.]), the intermediate product becomes easily deformable, and the compressing temperature is easily controlled and managed.

(2) Shape of Conical Intermediate Product

The intermediate product 540 described above is substantially in a conical shape of which generating line and axis form angle α (see FIG. 6A) that is 60°. Yet, the angle a may be any angle within a range of 45° to 70°.

When the angle a is larger than 70°, the height H of each of the grooves 595 and 596 of the molding jig 590 becomes smaller than 0.5 [mm]. This considerably reduces the manufacturing yield of conforming items in the process of winding straight glass tubes into conical intermediate products. Furthermore, when the angle α is smaller than 45°, the manufacturing yield of conforming items is reduced in the process of deforming conical intermediate products into arc tube bodies having a flat spiral shape.

When the angle α is 60°, the manufacturing yield is 90 [%] or higher in the process of winding straight glass tubes to spirally wound arc tube bodies. This manufacturing yield is the highest among the cases where the angle α was any other angle described above.

As described above, the height H of each of the grooves 595 and 596 is determined to be 0.56 times the outside diameter of the glass tube 510. The reason for determining the height H to such a size is to manufacture the arc tube body 110 having the gap Ga of 1 [mm]. As described above, it is desirable that the gap Ga between adjacent turns of the glass tube 112 to 1 [mm] to avoid uneven brightness. Another reason is to cause the angle β, which is an angle formed between the axis B and the generating line B1 of the imaginary conical surface of the molding jig 590, to be 60°. This angle is desirable for the above-identified reason.

<Modifications>

Up to this point, the present invention has been described by way of the above embodiment. It should be naturally appreciated, however, that the present invention is in no way limited to the specific embodiment described above. Various modifications including the following may be made.

I. Pressurizing Intermediate Product

A. Pressuring Method

According to the above embodiment, pressure (i.e. load) is applied to the intermediate product 540 by exploiting the weight of the movable plate 584. Yet, pressure may be applied by descending the movable plate under displacement control.

Hereinafter, a description is given to an example in which the movable plate is mechanically descended to deform the intermediate product. Note that the intermediate product and the compressing jig used in this example are identical to the ones described in the above embodiment.

First, the intermediate product is placed between the fixed plate and the movable plate. Here, the movable plate is attached to a pressure device, in parallel relation to the fixed plate. The pressure device is capable of controlling movement of the movable plate, for example, to a constant speed.

Next, at least the wound portions of the intermediate product are heated. The heating is controlled so as to raise the temperature of the wound portions to the range of 620 [° C.]±10 [° C.].

When the temperature of the wound portions of the intermediate product reaches 620 [° C.] at its outer surface, the pressure device starts to descend the movable plate at a constant speed of about 4.0 [mm/sec]. With this operation, the conical intermediate product is deformed into a flat arc tube body.

According to the above pressurizing method, the intermediate product is compressed and deformed without causing distortion or clack in the glass tube. The percentage of obtaining conforming items according to the above pressuring method is 97 [%] of the total number of intermediate products processed.

In the above testing using the mechanical pressurizing method, the movable plate is descended at 4.0 [mm/sec]. It has been confirmed that the descending speed may be within range of 3 [mm/min] to 5 [mm/min] to manufacture arc tube bodies at high percentage of conforming items.

In the above example, the movable plate is descended under displacement control. Yet, the flattening of the intermediate product may be carried out by descending the movable plate under pressure control. Specifically, the wound portions of the intermediate product are heated to a temperature equal to or higher than a point at which the glass tube becomes deformable and yet lower than the softening point of the glass tube. The heated intermediate product is then compressed from the direction of its imaginary axis. In this manner, the arc tube body is obtained in a desirable shape that is free from distortion of the glass tube.

In the above testing using the mechanical pressurizing method, the compressing temperature is adjusted to 620 [° C.], which is different from that of the above embodiment. Yet, the resulting arc tube body has a desirable shape in cross section of the glass tube, similarly to the one obtained according to the above embodiment.

B. Pressurizing Direction

In the above embodiment and modification, the intermediate product 540 is sandwiched between a pair of upper and lower plates (582 and 584), and the upper plate (584) is descended to compress the intermediate product 540. As an alternative, the upper plate may be made immovable and the lower plate may be ascended to sufficiently apply pressure to the intermediate product. As another alternative, both the upper and lower plates may be inwardly moved to compress the intermediate product.

C. Additional Note

The inventors of the present invention have found the following, based on observation of the intermediate product 540 being compressed and deformed in the compressing step. When the weight of the movable plate 584 is applied to the intermediate product 540, the deformation takes place first at portions closer to the fixed plate 582 and then gradually at portions closer and closer to the movable plate 584. The portion of the intermediate product in engagement against the movable plate 584 is deformed at the latest.

It is considered that the intermediate product 540 deforms first at portions closer to the fixed plate 582 due to the following reason. The turns of the wound portions 548 and 550 are lager in diameter at portions closer to the fixed plate 582 than at portions closer to the movable plate 584. Considering the wound portions of the intermediate product 540 as a spring, the spring constant is smaller at the lager-diameter portions. Thus, the wound portions are more easily deformable at the portions closer to the fixed plate 582.

Based on the above observation, it is assumed that the by compressing the innermost turn among the turns of the intermediate product, the outer turns are deformed before the innermost turn. This leads to eliminate the need to use, as in the above embodiment, the movable plate 584 that is approximately as large as the fixed plate 582. Alternatively, the fixed plate may be sufficient if the size is large enough to compress the innermost turn of the glass tube.

Note that in the above embodiment, the upper plate (equivalent to one of the pair of members of the present invention) is used as a movable body. Yet, the movable body is not limited to a plate or plate-like member. Alternatively, the movable body may be a cylindrical member (equivalent to one of the pair of members of the present invention) large enough to compress the innermost turn of the glass member.

II. Compressing Jig

According to the above embodiment, the compressing jig 580 deforms the wound portions 548 and 550 of the intermediate product 540 by descending the movable plate 584. The intermediate product 540 may vary to some extent in its outer diameter and height of the overall shape as well as in the size of the gap between adjacent turns of the glass tube. Due to the variations, it is difficult to apply uniform compressing force throughout the wound portions 548 and 550. As a result, the arc tube body 110 obtained by deforming the intermediate product 540 may not have a uniform gap Ga between each two adjacent turns of the glass tube 112.

Figure 13:
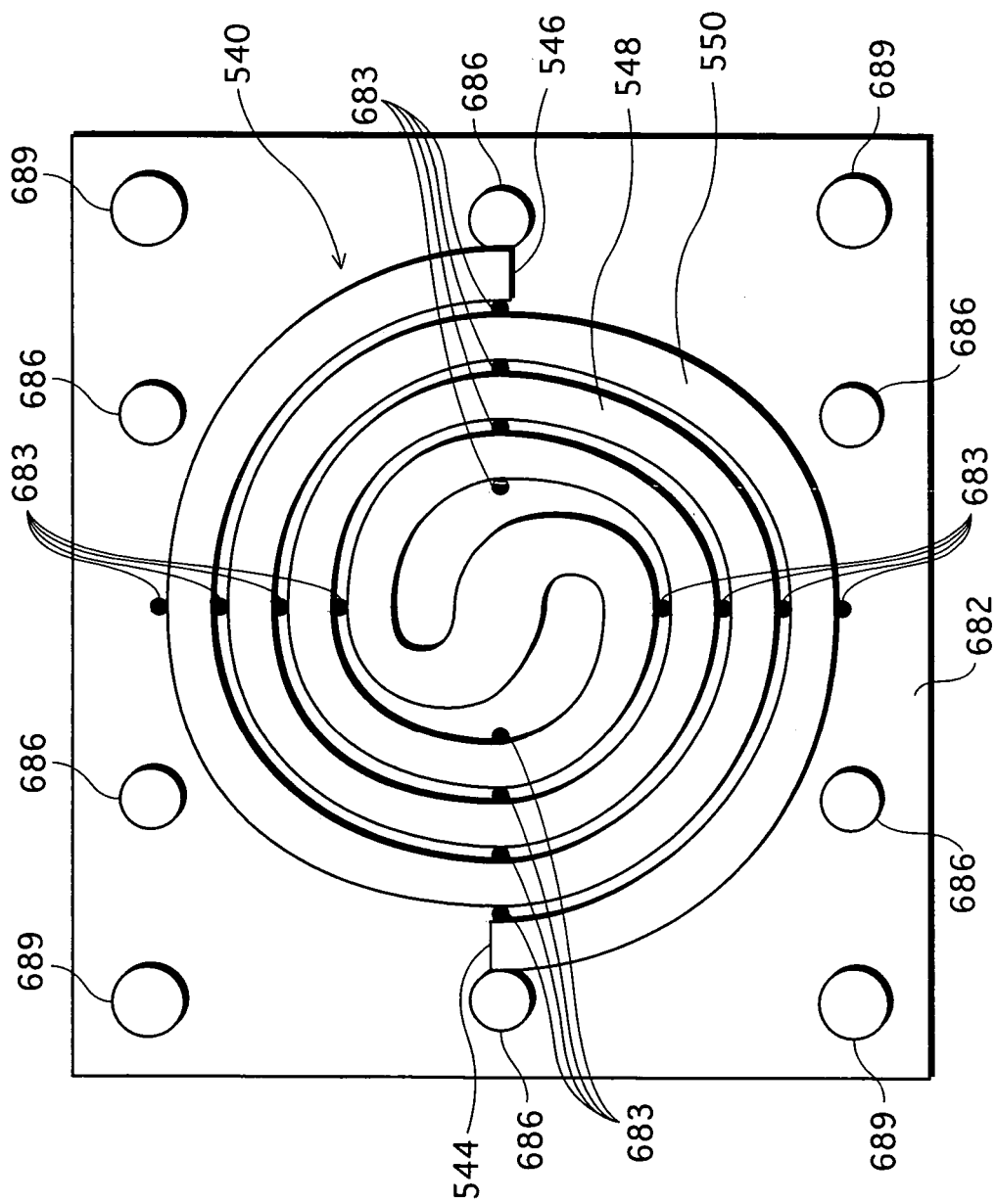
FIG. 13 is a plan view of a fixed plate of the compressing jig for forming an arc tube body having a substantially uniform gap between any two adjacent turns.

FIG. 13 is a plan view of a fixed plate of the compressing jig for forming an arc tube body having a substantially uniform gap between any two adjacent turns.

As shown in the figure, a fixed plate 682 is provided with holding pins 683 for holding the turns of the wound portions 548 and 550 at equal radial intervals. Similarly to the above embodiment, the fixed plate 682 is provided with stoppers 689 along the periphery thereof (in this case, the fixed plate is rectangular, so that the stoppers 689 are arranged each at one of the four corners). Also similarly to the above embodiment, guide pins 686 for guiding the movable plate are provided on the fixed plate at positions surrounding the intermediate product 540. Naturally, the movable plate is provided with through holes correspondingly to the holding pins 683 (not illustrated).

As shown in FIG. 13, a total of 16 holding pins 683 are provided along two directions, one connecting ends 544 and 546 of the intermediate product, and the other perpendicular to the connecting direction. Yet, the number and positions of the holding pins 683 are not limited to this specific example shown in FIG. 13.

A greater number of holding pins more reliably keep adjacent turns of the wound portions 548 and 550 in equally spaced relation. With the number of pins, however, the time and trouble increase for placing the intermediate product on the fixed plate 682. Thus, it is preferable to determine the number and positions of the holding pins 683 in consideration of the above in balance.

III. Arc Tube Shape

A. EXAMPLE 1

According to the above embodiment, the arc tube 100 is in a double-spiral shape that is formed by winding the glass tube 112 around the imaginary axis A from the middle portion 120 all the way to the respective ends 114 and 116. Each turn of the spiral is diametrically larger and larger as the turn is closer to the respective ends. Yet, the arc tube 100 may be in a single spiral shape that is formed by winding the glass tube at least partially. Specifically, the arc tube may be formed by winding the glass tube from the middle portion at least partway to one end.

In order to form an arc tube body having a flat and single-spiral shape, an intermediate product having a conical and single-spiral shape needs to be manufactured first. In this case, the molding jig 590 shown in FIG. 7 is additionally provided with a through hole that coincides with the axis B. The glass tube is made to run through the through hole from one end to the middle portion. The end of the glass tube is fixed to the molding jig. Then, similarly to the above embodiment, the glass tube is wound around the imaginary surface of the molding jig from the middle portion toward the other end.

In order to flatten the wound portion of the thus obtained intermediate product, the fixed plate 582 shown in FIG. 10 is additionally provided with a through hole for the non-wound portion of the intermediate product to pass through in the direction of the imaginary axis. With the non-wound portion inserted trough the through hole, the movable plate is descended in a similar manner to the above embodiment. As a result, an arc tube body having a flat and single-spiral shape is obtained.

B. EXAMPLE 2

According to the above embodiment, the arc tube body 110 has two wound portions that are formed by winding the two portions 510b and 510c of the glass tube 510 throughout their lengths. Yet, it is applicable that only part of the two portions 510b and 510c are wound around. An example of such an arc tube body may have a bend connecting a spirally wound potion and a non-wound portion extending to the end of the glass tube, in the direction of the imaginary axis A.

C. EXAMPLE 3

According to the above embodiment, the intermediate product 540 has wound portions with a substantially constant pitch both axially and diametrically of the molding jig. Yet, the winding pitch does not have to be constant.

Figure 14A:
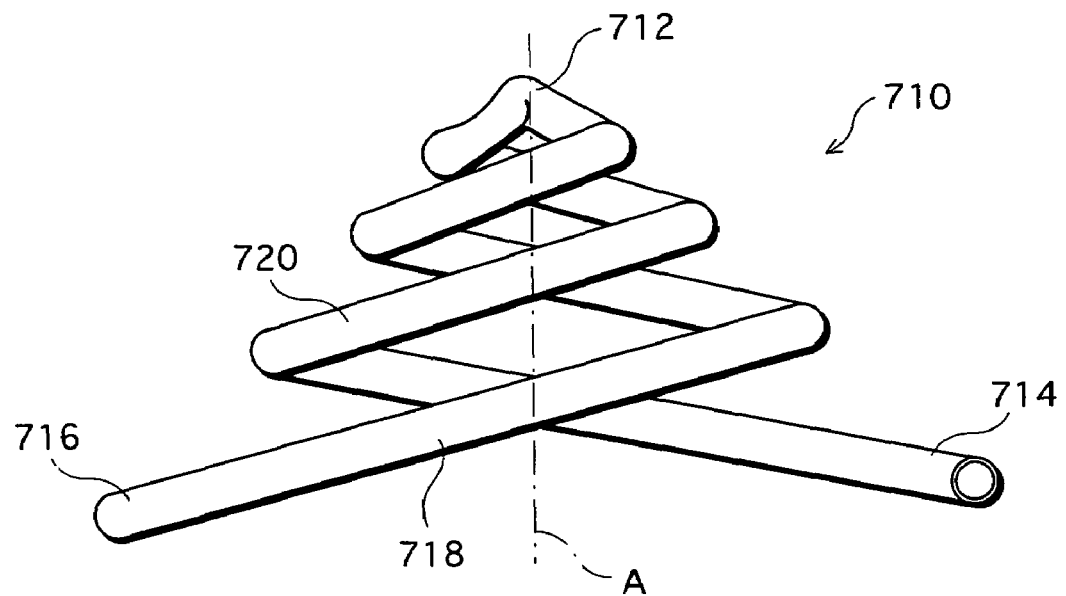
FIG. 14A is a view showing a modified shape of the intermediate product.
Figure 14B:
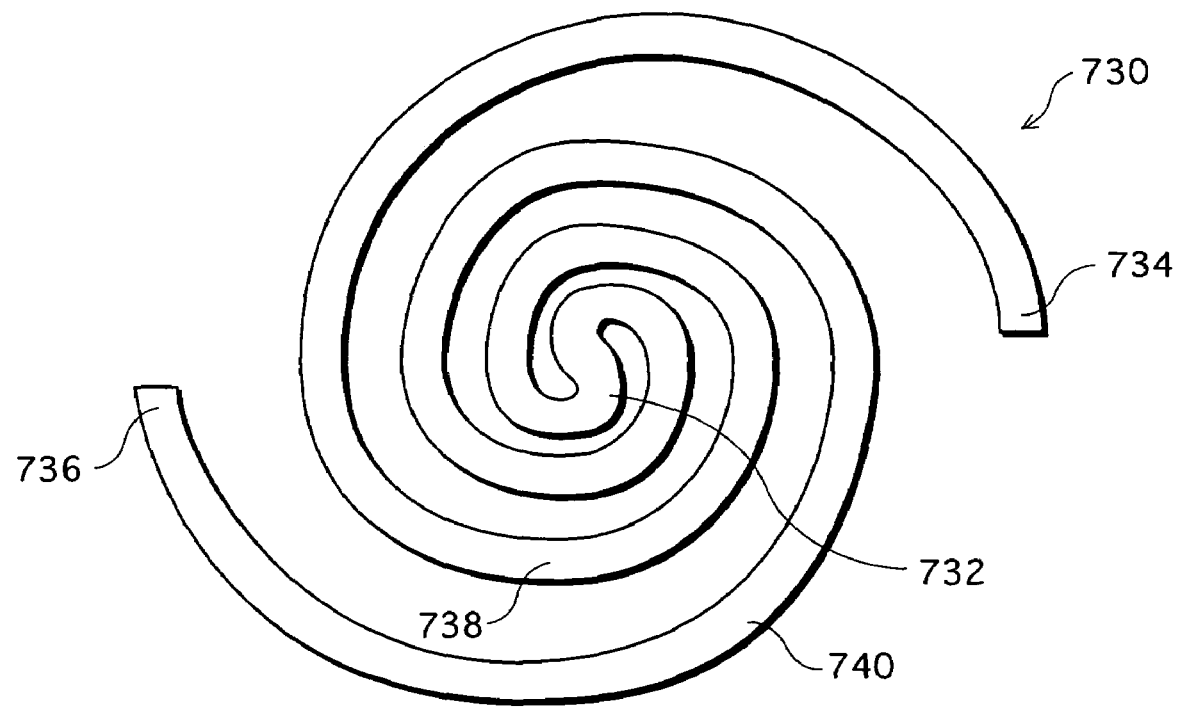
FIG. 14B is a view showing a modified shape of the arc tube body.

FIG. 14A shows a modified shape of the intermediate product. FIG. 14B shows a modified shape of the arc tube body.

As shown in FIG. 14A, an intermediate product 710 is in a conical spiral shape that are wound from a middle portion 712 toward ends 714 and 716 thereof. The winding pitch of wound portions 718 and 720 is gradually larger both axially and diametrically.

FIG. 14B shows an arc tube body 730 manufactured by compressing the above-described intermediate product 710 from the direction of the imaginary axis. As shown in the figure, a gap between adjacent turns of wound portions 738 and 740 is larger at a position of the glass tube farther away from a middle portion 732 of the arc tube body 730 and thus closer to respective ends 734 and 736 of the arc tube body 730. That is to say, the pitch of the winding is not constant and gradually larger in the outwardly radial direction.

D. EXAMPLE 4

According to the above embodiment, the wound portions 548 and 550 of the intermediate product 540 are flattened throughout their lengths. Yet, it is applicable that only part of the wound potions is flattened.

Figure 15:
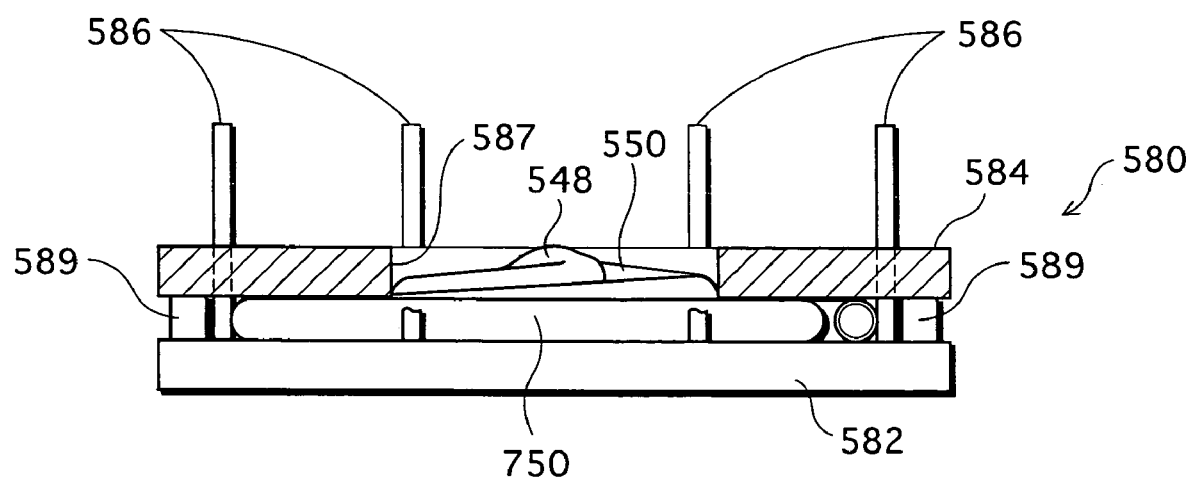
FIG. 15 is a view showing an arc tube body formed by flattening part of wound portions of the intermediate product.

FIG. 15 shows an arc tube body 750 formed by flattening part of the wound portions of the intermediate product 540 described in the above embodiment. As shown in the figure, the wound portions 548 and 550 only at part that is located within the lower half of the overall height of the intermediate product 540. In order to flatten only part of the wound portions, the movable plate 584 of the compressing jig 580 is provided with a though hole that is diametrically larger than the through hole 587, so as to accommodate therein the upper half of the wound portions 548 and 550.

E. EXAMPLE 5

According to the above embodiment, the wound portions 548 and 550 spiral around the conical surface of a circular cone. Thus, when seen from the axial direction of the cone, the wound portions 548 and 550 are substantially circular around the imaginary axis A. Yet, it is applicable that the wound portions may be wound around the imaginary axis A to form a polygonal shape when seen from the axial direction. A glass tube may be wound to define a polygonal shape by using a molding jig of a pyramidal cone having multiple triangular lateral faces.

IV. Glass Tube Material

According to the above embodiment, the glass tube is made of lead-free glass. Yet, the material for the glass tube is not limited to lead-free glass. Alternatively, hard glass, lead glass, and soda glass may be used. Naturally, each glass material (ingredient of glass) has its own softening point. Thus, it is necessary to adjust the target temperature at the time of heating the intermediate product in the compressing step.

According to the above embodiment, in addition, the outside diameter of the glass tube is 9.0 [mm]. It is preferable that the outside diameter of the glass tube falls within the range of 5 [mm] to 17 [mm] for the following reasons. When the glass tube is smaller than 5 [mm] in outside diameter, it is difficult to manufacture the arc tube, considering the size of coli electrodes that need to be sealed within the grass tube. On the other hand, when the glass tube is larger than 17 [mm] in outside diameter, the resulting arc tube becomes relatively large.

V. Bulge of Arc Tube

According to the above embodiment, the bulge 126 of the arc tube 100 is formed at the apex of the intermediate product 540 before deforming the wound portions 548 and 550. As an alternative, the bulge 126 may be formed after deforming the wound portions 548 and 550. To this end, the apex and its nearby portion of the flattened arc tube body are locally softened, followed by increasing the internal pressure of the arc tube body. This modification eliminates the need to provide the through hole 587 in the movable plate 584 of the compressing jig 580.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An arc tube comprising a glass tube having at least one portion spirally wound around an imaginary axis, wherein
    the spiraled portion of the glass tube has a tube axis substantially within one plane perpendicular to the imaginary axis,
    a minimum gap between adjacent turns of the spiraled portion is not less than 0.5 mm and not greater than 0.4 times an outside diameter Dl of the glass tube in mm, and
    the glass tube has two portions spirally wound around the imaginary axis extending through to respective ends of the glass tube from a middle portion of the glass tube.

2. The arc tube according to claim 1, wherein
    an outside diameter of the glass tube is not less than 5 mm and not greater than 17 mm.

3. A low-pressure mercury discharge lamp comprising the arc tube as defined in claim 1.

4. An illumination apparatus comprising the low pressure discharge tube as defined in claim 3.

5. The arc tube according to claim 1 wherein the respective ends are within the same one plane perpendicular to the imaginary axis.

6. The arc tube according to claim 1 wherein a middle portion of the glass tube has a bulge on the imaginary axis.

7. The arc tube according to claim 6 wherein a gap between the spiral portions from the bulge to a glass tube end progressively becomes smaller to a first smallest gap positioned on a plane containing a tube axis and a second smallest gap on the plane containing the tube axis, each of the first smallest gap and the second smallest gap are upstream from the respective tube ends and the space increases in distance from the respective first and second smallest gaps to the respective glass tube ends.

8. An arc tube according to claim 1 wherein the glass tube is elliptical in cross sectional shape.

* * * * *